(12) United States Patent
Smith et al.

(10) Patent No.: US 11,850,530 B2
(45) Date of Patent: Dec. 26, 2023

(54) MOTION SIMULATION APPARATUS

(71) Applicant: ASSURED IT PTY LTD, Morningside (AU)

(72) Inventors: Alan Smith, Gaythorne (AU); Justin Kinchington, Morningside (AU)

(73) Assignee: KINCHINGTON HOLDINGS PTY LTD, Morningside (AU)

( * ) Notice: Subject to any disclaimer, the term of this patent is extended or adjusted under 35 U.S.C. 154(b) by 196 days.

(21) Appl. No.: 17/310,297

(22) PCT Filed: Jan. 31, 2020

(86) PCT No.: PCT/AU2020/000010
§ 371 (c)(1),
(2) Date: Jul. 27, 2021

(87) PCT Pub. No.: WO2020/154758
PCT Pub. Date: Aug. 6, 2020

(65) Prior Publication Data
US 2022/0193561 A1    Jun. 23, 2022

(30) Foreign Application Priority Data
Jan. 31, 2019 (AU) .................................. 2019900285

(51) Int. Cl.
*A63G 31/16* (2006.01)
*A63G 31/02* (2006.01)

(52) U.S. Cl.
CPC ............. *A63G 31/02* (2013.01); *A63G 31/16* (2013.01)

(58) Field of Classification Search
CPC ........ A63G 31/00; A63G 31/02; A63G 31/16; G09B 9/00; G09B 9/02; G09B 9/08; G09B 9/12; G09B 9/14

(Continued)

(56) References Cited

U.S. PATENT DOCUMENTS 3,577,659 A    5/1971  Kail
3,619,911 A *  11/1971  Pancoe .................... G09B 9/14
                                                          434/58

(Continued)

FOREIGN PATENT DOCUMENTS

CN    102 289 965 A    12/2011
CN    103126362 A       6/2013

(Continued)

OTHER PUBLICATIONS

Supplementary European Search Report, EP 20 74 8078, dated Feb. 23, 2022, 8 pages.
Marks & Clerk Singapore LLP, Search Report, dated Jun. 11, 2023.

*Primary Examiner* — Kien T Nguyen
(74) *Attorney, Agent, or Firm* — Folio Law Group PLLC

(57) ABSTRACT

A motion simulation apparatus includes a motion platform. A carrier for carrying a user is mounted on the motion platform. The apparatus has a drive arm with a lower end that is pivotally mounted on a substrate to pivot relative to the substrate with two degrees of freedom of movement and an upper end that is pivotally connected to the motion platform to pivot with respect to the motion platform with two degrees of freedom of movement. The apparatus has two guide arms, each guide arm having a lower end that is pivotally mounted on the substrate to pivot relative to the substrate with three degrees of freedom of movement and an upper end that is pivotally connected to the motion platform to pivot relative to the motion platform with three degrees of freedom of movement. The drive arm, the guide arms and the motion platform define a dynamic frame that can pivot with respect to the substrate such that a resultant movement of the motion platform can be imparted to the carrier.

21 Claims, 22 Drawing Sheets

(58) Field of Classification Search
USPC .......................... 472/59–60, 130; 434/29, 55
See application file for complete search history.

(56) References Cited

U.S. PATENT DOCUMENTS

| | | | | |
|---|---|---|---|---|
| 3,967,387 | A * | 7/1976 | Marchegiani | G09B 9/14 |
| | | | | 248/371 |
| 5,597,359 | A * | 1/1997 | Byerly | A63G 31/16 |
| | | | | 472/60 |
| 5,752,834 | A | 5/1998 | Ling | |
| 6,077,078 | A * | 6/2000 | Alet | F16M 11/18 |
| | | | | 472/130 |
| 8,298,845 | B2 | 10/2012 | Childress | |
| 9,757,658 | B1 * | 9/2017 | Kaufmann | A63G 7/00 |
| 10,668,395 | B1 * | 6/2020 | Lee | A63G 31/02 |
| 2008/0124683 | A1 | 5/2008 | Medford | |
| 2014/0302462 | A1 | 10/2014 | Vatcher et al. | |

FOREIGN PATENT DOCUMENTS

| | | | |
|---|---|---|---|
| CN | 103144106 | A | 6/2013 |
| CN | 103394202 | A | 11/2013 |
| CN | 108525292 | A | 9/2018 |
| WO | 1980001011 | A1 | 5/1980 |
| WO | 1999009538 | A1 | 2/1999 |

\* cited by examiner

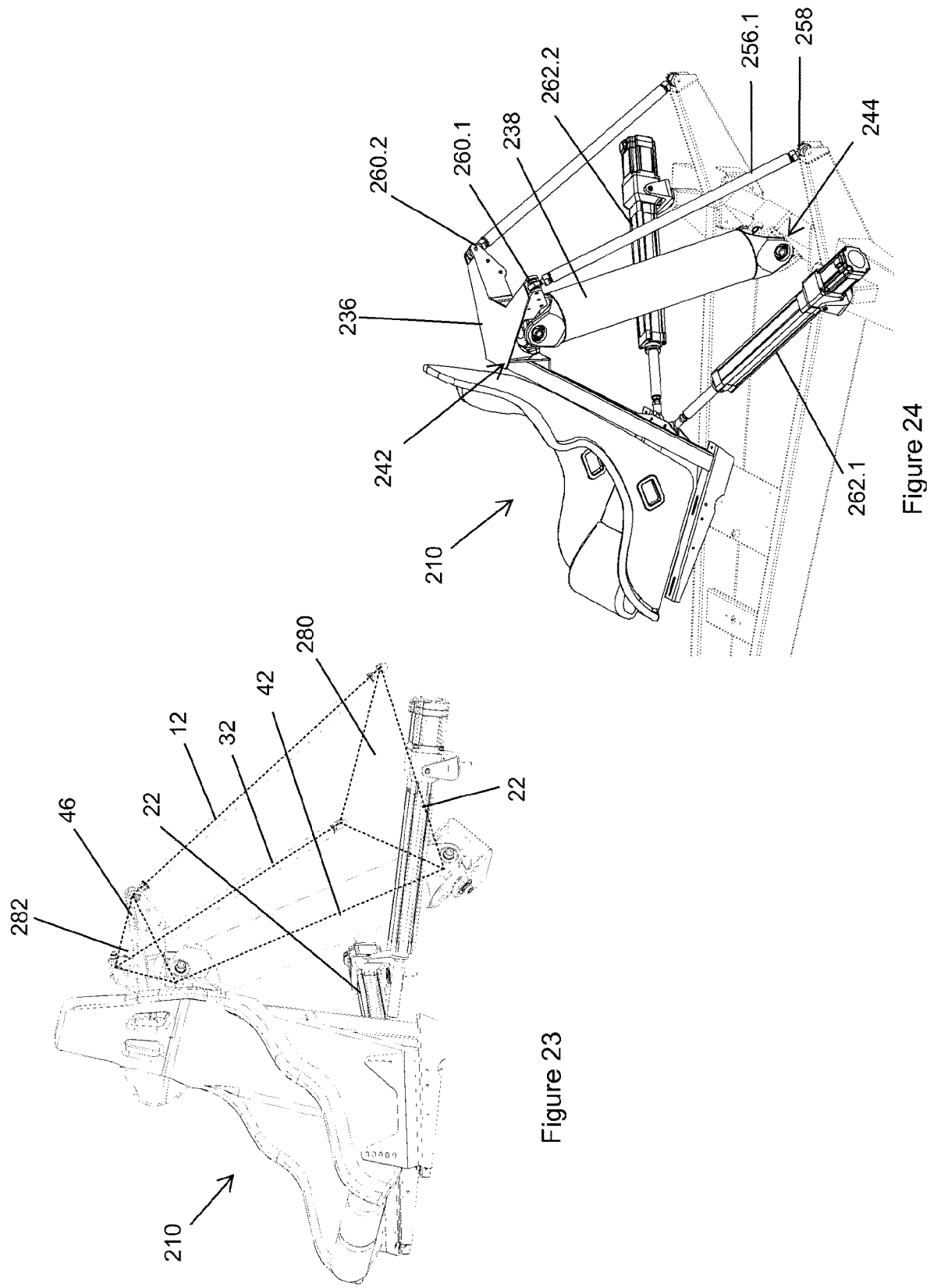

MOTION SIMULATION APPARATUS

FIELD OF THE INVENTION

Various embodiments of a motion simulation apparatus are described herein.

BACKGROUND TO THE INVENTION

Motion simulation requires the generation of an effect or feeling, in a human being, of being in a moving vehicle. To describe the different types of motion, we can make use of a Cartesian coordinate system with a point (0; 0; 0) at a centre of gravity of the vehicle. An x-axis extends along a line of linear acceleration and deceleration between a front and the rear of the vehicle, a y-axis is at right angles to the x-axis and extends from one side of the vehicle to the other, and a z-axis is at right angles to both the x-axis and the y-axis. Thus, we can define different types of movement of the vehicle as follows:

"Pitch" is an amount of rotation about a y-axis.
"Roll" is an amount of rotation about an x-axis.
"Yaw" is an amount of rotation about a z-axis.
"Surge" is acceleration or deceleration along the x-axis.
"Sway" is acceleration or deceleration along the y-axis.
"Heave" is acceleration or deceleration along the z-axis.

These are six types of movement of a vehicle. It is understood that all movement of a vehicle can be described using one or more of these degrees of movement. For example, cornering is usually a combination of sway, yaw and perhaps roll. Braking or accelerating is usually a combination of pitching and surging.

It is understood that it is difficult to simulate at least surge and sway, which are elements of linear movement. The reason is that a motion simulation platform is not configured for sustained linear movement.

Generally, surge can be simulated using one of two techniques:

Accelerating the simulator in the direction of the simulated motion, in other words, generating linear acceleration.

Pitching the simulator away from a vertical axis (the z-axis), which allows a resultant change in orientation with respect to gravity to be perceived by the user as acceleration or deceleration along the x-axis, in a direction opposite to the direction of pitch.

Many entry-level motion simulators adopt a two degree of freedom (2 DOF) model with a pivot arrangement positioned beneath a seat of the motion simulator. Such simulators are only capable of generating pitch, which is used to simulate acceleration and braking, and roll, which is used to simulate centrifugal forces experienced during cornering.

Such simulators have limitations to their ability to generate realistic movement. For example, the pitch used to simulate acceleration usually results in a detectable virtual deceleration. Orienting the seat for any virtual acceleration requires acceleration in an opposite direction to reach the target orientation. Such opposite acceleration is often detectable. Also, with such simulators, it can be difficult to generate yaw and roll when simulating turning. Thus, the simulators generate roll only, which is more easily perceived as tilting rather than turning.

An issue with such simulators is that the larger the extent of movement, the less realistic it becomes. Plausibly, this is the reason why simulators of this type that target the professional market do not appear to move that much.

A Stewart Platform (https://en.wikipedia.org/wiki/Stewart_platform) is one attempt at achieving realistic motion simulation. Such platforms are currently in use for high-end flight simulation, machine tool technology, crane technology and various other applications.

The Stewart platform includes six prismatic actuators, such as hydraulic jacks or electric actuators attached in pairs in three positions on the base of a platform. Thus, devices placed on the top plate can experience the six types of movement described above.

Such platforms can be expensive and bulky. For example, in a gaming apparatus, such as one in which the movement of a vehicle is simulated, the actuators are all positioned beneath the seat. Furthermore, the use of six actuators can add a significant expense to the platform, making it generally unavailable for the gaming industry.

SUMMARY OF THE INVENTION

According to a first aspect of the invention, there is provided a motion simulation apparatus that includes:
a motion platform;
a carrier for carrying a user, the carrier being mounted on the motion platform;
a drive arm, the drive arm having a fixed end that is pivotally mounted on a substrate to pivot relative to the substrate with two degrees of freedom of movement and a working end that is pivotally connected to the motion platform to pivot with respect to the motion platform with two degrees of freedom of movement; and
two guide arms, each guide arm having a lower end that is pivotally mounted on the substrate to rotate relative to the substrate with three degrees of freedom of movement and an upper end that is pivotally connected to the motion platform to rotate relative to the motion platform with three degrees of freedom of movement, the drive arm, the guide arms and the motion platform defining a dynamic frame that can pivot with respect to the substrate such that a resultant movement of the motion platform can be imparted to the carrier.

The drive arm and the guide arms may be angled towards each other from the substrate to the motion platform such that longitudinal axes of the arms intersect at a virtual pivot point, with the motion platform interposed between the substrate and said virtual pivot point.

The drive arm may be forwardly positioned with respect to the guide arms.

Respective planes in which the working and fixed ends of the arms are located may be angularly offset with respect to each other such that pivoting of the dynamic frame causes the drive arm to impart rotation to the motion platform as the drive arm pivots to accommodate the angular offset of the respective planes.

The motion simulation apparatus may include two actuators, each actuator having a linearly fixed end that is pivotally mounted to the substrate to pivot relative to the substrate with two degrees of freedom of rotational movement, and a working end that is pivotally mounted with three degrees of freedom of rotational movement to the carrier, the arms being interposed between the actuators.

The actuators may converge towards each other from their fixed ends to their working ends.

The guide arms may be of substantially the same length.

The motion simulation apparatus may include a base assembly, the carrier including a seat assembly arranged above the base assembly, the seat assembly having a seat support and a back support.

The motion platform may include a hub that is fixed to a head region of the back support, the drive arm being in the form of a drive shaft having an operatively upper connector and an operatively lower connector, the upper connector being engaged with a complementary connector of the hub to provide an upper joint that limits movement of the hub relative to the drive shaft to two degrees of freedom of rotational movement and the lower connector being engaged with a complementary connector of the base assembly to provide a lower joint that limits movement of the drive shaft relative to the base assembly to two degrees of rotational movement.

The two guide arms may be in the form of two guide struts, each guide strut positioned on a respective side of the drive shaft and having an operatively upper connector and an operatively lower connector, the upper connector being engaged with a complementary connector of the hub to provide an upper joint that permits rotational movement of the hub relative to each guide strut with three degrees of freedom of movement, and each lower connector being engaged with a complementary connector of the base assembly to provide a lower joint that permits rotational movement of the hub relative to each strut relative to the base assembly with three degrees of freedom of movement.

The apparatus may include two linear actuators, the actuators being positioned on respective sides of an operatively vertical plane in which the drive shaft is located when the drive shaft is tilted neither left nor right, each linear actuator interconnecting the base assembly and the seat assembly.

The upper and lower joints of the drive shaft and the guide struts may be positioned generally in respective planes to define a dynamic frame that can pivot with respect to the base assembly such that resultant movement of the hub can be imparted to the seat assembly.

A configuration of the base assembly may be adjustable to alter a relative angular orientation of the base assembly and the hub such that pivoting of the dynamic frame causes the drive shaft to impart rotation of the hub to simulate yaw.

The upper connector of the drive shaft and the complementary connector of the hub may be provided by an upper universal joint, and the lower connector of the drive shaft and the complementary connector of the base assembly may be provided by a lower universal joint.

Each linear actuator may be connected, at a fixed end, to the base assembly with a joint that limits relative movement of the linear actuator and the base assembly to at least two degrees of freedom of rotational movement and, at a working end, to the seat assembly with a joint that limits relative movement of the linear actuator and the seat assembly to between two and four degrees of freedom of movement.

The apparatus may include a cockpit floor positioned between the base assembly and the seat assembly.

A joint assembly, that is configured to provide rotational movement with two degrees of freedom of movement, is interposed between the seat support and the cockpit floor so that the seat assembly can rotate with two degrees of freedom relative to the cockpit floor.

The motion simulation apparatus may include two control strut assemblies, each control strut assembly interconnecting the drive shaft and the cockpit floor, on respective sides of the cockpit floor, with joints that permit two degrees of freedom of rotational movement and three degrees of freedom of translational movement between the drive shaft and the cockpit floor, so serving to constrain roll of the cockpit floor.

A connector assembly may be interposed between the cockpit floor and the base assembly. The connector assembly may be configured to facilitate pivotal movement of the cockpit relative to the base assembly about an operatively vertical axis positioned forwards of the seat assembly. The connector assembly may include a pivot arm pivotally connected at one end to the base and at an opposite end to the cockpit floor, forwards of the seat assembly. The connector assembly may include a linear bearing assembly interposed between the cockpit floor and the base to facilitate fore and aft movement of the cockpit floor relative to the base.

Such an arrangement may meet the requirement of motion simulation which is that any action producing an acceleration effect should position the simulator such that any subsequent acceleration is not compromised by the action preceding it to a point where the simulation is no longer convincing. Such a requirement has been demonstrated to be largely unachievable with the motion simulators referred to in the above background.

The apparatus described herein may achieve a transition from linear acceleration to virtual acceleration without the generation of detectable forces in directions opposite to those being simulated. More particularly, the apparatus described herein is an arrangement wherein an initial linear acceleration, from a current frame of reference, may be possible in a direction of a required "simulated" acceleration to reach a required position or orientation of the simulated acceleration.

The upper and lower joints of the drive shaft and the guide struts may be positioned generally in respective, substantially parallel planes to define a dynamic frame in which the vertices are jointed, the dynamic frame having opposed quadrilateral sides.

According to a second aspect of the invention, there is provided a motion simulation apparatus that includes:
  a base assembly;
  a seat assembly arranged above the base assembly, the seat assembly having a seat support and a back support;
  a hub that is fixed to a head region of the back support;
  a drive shaft having an operatively upper connector and an operatively lower connector, the upper connector being engaged with a complementary connector of the hub to define an upper joint that limits movement of the hub relative to the drive shaft to two degrees of freedom of rotational movement and the lower connector being engaged with a complementary connector of the base assembly to define a lower joint that limits movement of the drive shaft relative to the base assembly to two degrees of freedom of rotational movement;
  two guide struts, each guide strut positioned on a respective side of the drive shaft and having an operatively upper connector and an operatively lower connector, the upper connector being engaged with a complementary connector of the hub to define an upper joint that permits rotational movement of the hub relative to each guide strut with three degrees of freedom of movement, and each lower connector being engaged with a complementary connector of the base assembly to define a lower joint that permits rotational movement of each guide strut relative to the base assembly with three degrees of freedom of movement; and
  two linear actuators, the actuators being positioned on respective sides of an operatively vertical plane in which the lower joint of the drive shaft is located, each linear actuator interconnecting the base assembly and the seat assembly.

BRIEF DESCRIPTION OF THE DRAWINGS

FIG. 23 shows a schematic of a seat assembly, actuators and dynamic frame of the motion simulation apparatus.

FIG. 24 shows a simplified view of a rear of the motion simulation apparatus.

DETAILED DESCRIPTION OF EMBODIMENTS

Figure 1:
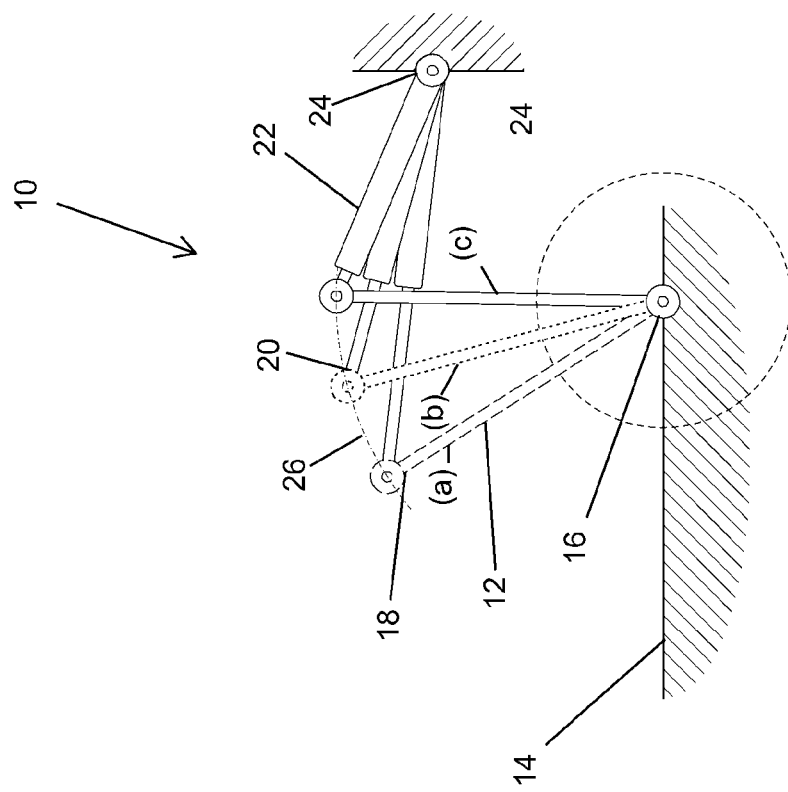
FIG. 1 is a schematic showing the motion produced by a single actuator and a single pivot arm, for the purposes of illustration.
Figure 3:
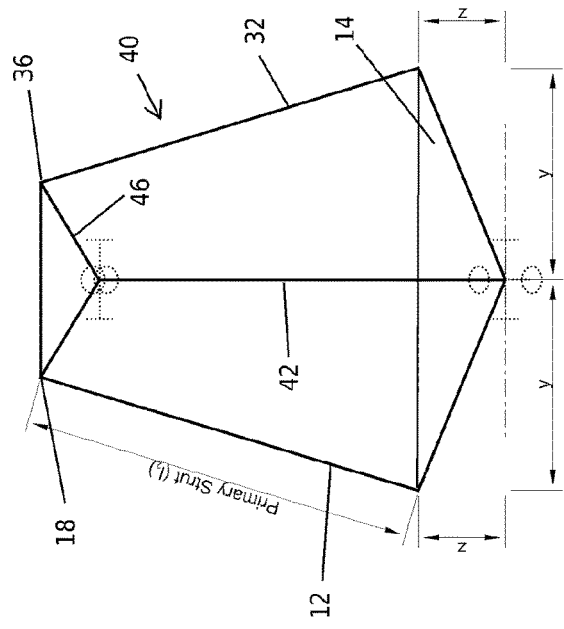
FIG. 3 is a diagram of a dynamic frame of the motion simulation apparatus, viewed from above.
Figure 4:
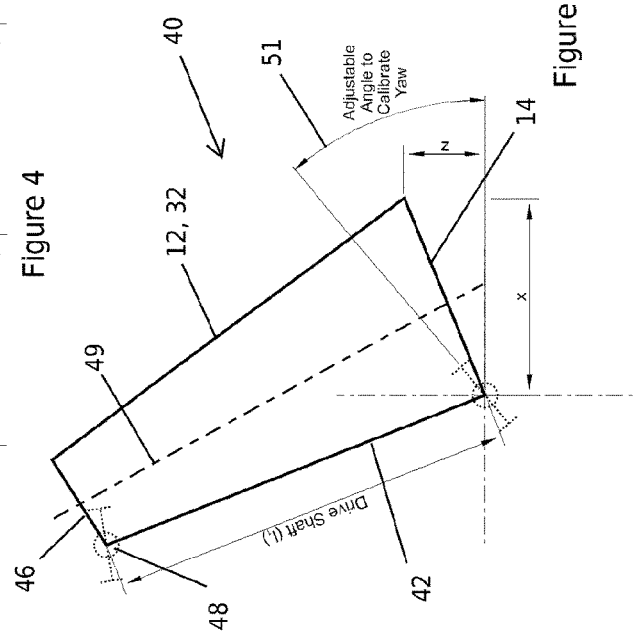
FIG. 4 is a diagram of the dynamic frame of FIG. 3, viewed from a front.
Figure 5:
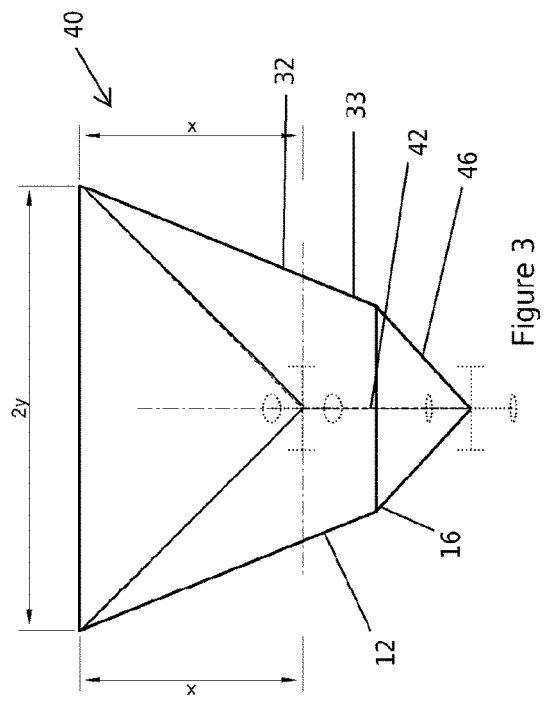
FIG. 5 is a perspective diagram of the dynamic frame.

In FIG. 1, there is shown a pivot assembly 10 that includes a first pivot arm 12. The pivot arm 12 is pivotally mounted to a substrate 14 at a lower end 16 so that the pivot arm 12 can pivot with one degree of freedom of rotational movement relative to the substrate 14. For the sake of illustration, the pivot arm 12 is shown in three positions, namely, (a), (b) and (c). An upper end 18 of the pivot arm 12 is pivotally connected to a working end 20 of an actuator 22, to pivot with one degree of freedom of rotational movement with respect to the working end 20. A nonworking end 24 of the actuator 22 is pivotally mounted to the substrate 14, to pivot with one degree of freedom of rotational movement with respect to the substrate 14.

As can be seen in FIG. 1, the upper end 18 of the pivot arm 12 moves along a circular path 26.

Figure 2:
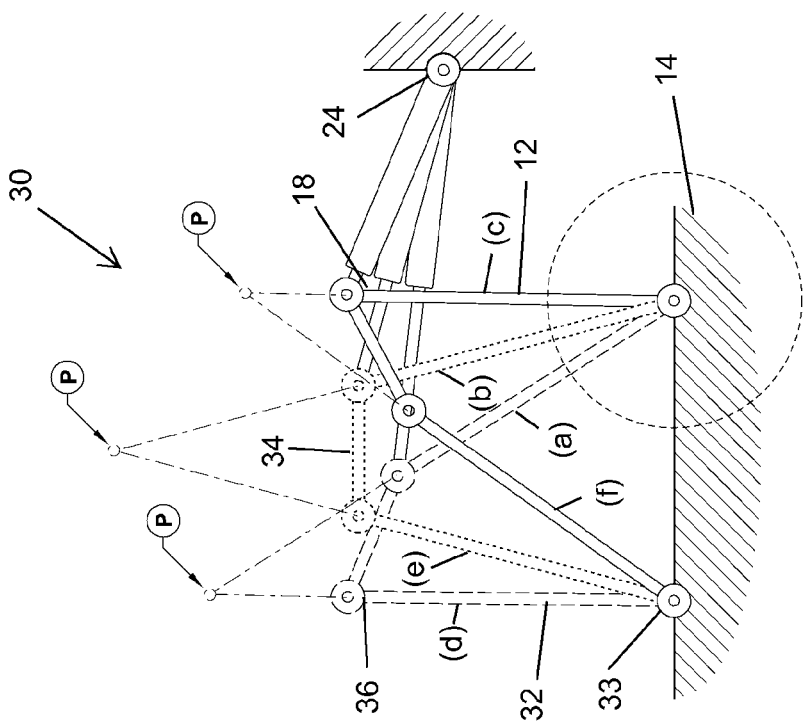
FIG. 2 is a schematic showing the motion produced by a single actuator acting on two pivot arms interconnected at one end with a control arm, for the purposes of illustration.

In FIG. 2, reference numeral 30 generally indicates a pivot assembly that includes a second pivot arm 32. For the sake of illustration, the pivot arm 32 is shown in three positions, namely (d), (e) and (f). The pivot assembly 30 includes a control arm 34 that is pivotally connected, at one end, to the upper end 18 of the pivot arm 12, with one degree of freedom of rotational movement, and, at an opposite end, to an upper end 36 of the second pivot arm 32, with one degree of freedom of rotational movement. A lower end 33 of the second pivot arm 32 is pivotally connected to the substrate 14 with one degree of freedom of rotational movement.

This arrangement illustrates the generation of a virtual pivot point P at an intersection of lines extending from the first and second pivot arms 12, 32, respectively. This generation of a virtual pivot point is an important aspect of the working of the motion simulation apparatus as described below. Operation of the actuator 22 can cause movement of the pivot point P so as to generate an extent of linear movement of the control arm 34 as the pivot arms 12, 32 are reciprocally pivoted, as can be seen in the various positions of the virtual pivot point P.

The control arm 34 can establish a motion platform for a motion simulation apparatus in accordance with various embodiments of the invention. In application, the motion platform can be connected to a seat of the motion simulation apparatus. Thus, the virtual pivot point P would be positioned above the user's head. As a result, a vestibular region of a user can experience linear or translational movement as a position of the virtual pivot point P adjusts, followed by pendular movement in the same direction. This can be used to provide a sense of reality to any of the six types of movement, or combination thereof, of a vehicle, as described above. Furthermore, movement of a base of the seat can be relatively larger than movement at the user's head. This is ideal for the simulation of acceleration and deceleration. Such movement is difficult to achieve even with the Stewart platform described above.

In FIGS. 3 to 6, reference numeral 40 generally indicates a schematic pivot assembly or dynamic frame which is a development from the pivot assembly 30. With reference to the preceding drawings, like reference numerals refer to like parts, unless otherwise specified.

The pivot assembly 40 makes use of a third pivot arm, which can be regarded as a drive arm or drive shaft 42, when the dynamic frame is pivoted with actuators. A lower end of the drive arm 42 is pivotally connected to the substrate 14 or to a fixed base or base assembly to pivot with two degrees of movement relative to the substrate 14. The first and second pivot arms can be regarded as first and second guide arms or struts 12, 32. The drive arm 42 is positioned forwardly with respect to the guide arms 12, 32. The guide arms 12, 32 are of substantially the same length.

A motion platform 46 (FIG. 5) is connected to the upper ends 18, 36 of the guide arms 12, 32, respectively, and to an upper end 48 of the drive arm 42 so that the guide arms 12, 32 can each pivot with three degrees of freedom of rotation relative to the motion platform 46 while the drive arm 42 can pivot with two degrees of freedom of rotation relative to the motion platform 46. Thus, in the pivot assembly 40, the motion platform 46 effectively replaces the control arm 34. It will be appreciated that FIGS. 1 and 2 are two-dimensional representations of the arrangement shown in FIGS. 3 to 6. Thus, the virtual pivot point P referred to above is established above the motion platform 46. The drive arm 42 and the guide arms 12, 32 are angled towards each other from the substrate to the motion platform 46, such that longitudinal axes of the arms 12, 32, 42 intersect at the virtual pivot point P, with the motion platform 46 interposed between the substrate and the virtual pivot point P.

When the pivot assembly 40 is used for motion simulation, the lower ends 16, 33, 44 of the arms 12, 32, 42, respectively, are fixed relative to each other and the substrate is operatively immovable during simulation. The upper ends 18, 36, 48 of the arms 12, 32, 42 are fixed relative to each other, while the motion platform 46 is capable of movement relative to the substrate 14. It will be appreciated that the range of movement of the motion platform 46 is constrained by the arms 12, 32, 42.

A component, such as a carrier, of a motion simulation device or apparatus is mounted on, or is an extension of, the motion platform 46. The component can be driven by a suitable actuator which would result in any point on the motion platform being constrained to movement in a unique curved surface in three-dimensional space.

In the motion simulation apparatus described herein, the drive arm 42 is pivotal into a position in which it is in a vertical plane that bisects the pivot assembly or dynamic frame 30. As will be seen below, the drive arm 42 can form a drive shaft of the motion simulation apparatus. In the following description, the component is a seat assembly of the motion simulation device. However, it is to be appreciated that the component could be in the form of any other interface between a user and the apparatus.

The second and third pivot arms 32, 12, can be in the form of first and second (or left-hand and right-hand) guide arms or struts, as will also be described in further detail below.

As can be seen in FIGS. 3 to 6, the pivot arms 12, 32 and drive arm 42 can be connected between the motion platform 46 and the substrate 14, with suitable upper and lower connectors, such that the points of connection to the motion platform 46 define the apices of a triangle and the points of connection to the substrate 14 also define the apices of a triangle. Furthermore, the pivot arms 12, 32 and drive arm 42 are angled towards each other from the substrate 14 to the motion platform 46. The triangle defined at the substrate 14 can be in the form of a right-angled Isosceles triangle with the drive arm 42 extending from the apex that defines the right angle. With this configuration, and with the pivot arms 12, 32 and drive arm 42 being of substantially the same length, and the respective triangles in parallel planes, pivotal movement of the arms results in the motion platform being constrained to movement within a spherical surface in three-dimensional space. Furthermore, a virtual pivot point will be defined at an intersection of longitudinal axes of the pivot arms 12, 32, 42 at a point that is operatively above the motion platform 46. Operation of the actuators results in a curved displacement of the virtual pivot point. Thus, if a vestibular region of a person is positioned at or near the motion platform 46, the vestibular region will sense an initial linear movement followed by pendular movement, which has been found to enhance the simulation of acceleration or deceleration.

Figure 6:
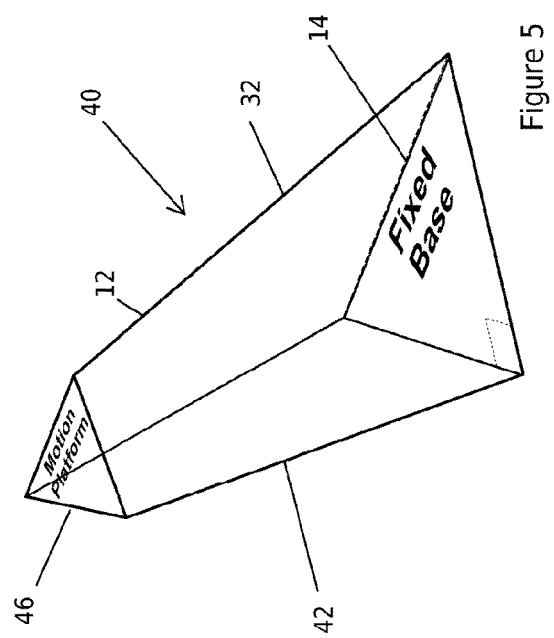
FIG. 6 is a diagram of the dynamic frame, viewed from a side and illustrating a manner of adjusting an extent of yaw to be generated by the dynamic frame.

It will be appreciated that when the triangle defined by the points of connection to the motion platform 46 is parallel to the triangle defined by the points of connection to the substrate 14, relative rotation of the motion platform 46 and the fixed base 14, about a line 49 perpendicular to the triangles is substantially non-existent when the pivot arms 12, 32, 42 tilt relative to the that line. However, as can be seen in FIG. 6, the fixed base 14 can be configured to tilt to adjust an angle 51 of the triangular plane of connection to the substrate 14 relative to the pivot arms 12, 32 and drive arm 42. This brings the respective planes in which the ends of the arms are located into angular offset relationship with respect to each other and thus the triangles out of respective parallel planes. In other words, when forward tilting axes (yaw axes) of rotation of universal joints at ends of the pivot arms 12, 32 are not parallel, shifting the motion platform left or right will produce some rotation of the motion platform 46, resulting in the arms 12, 32 rotating about the z axis. In that condition, when the pivot assembly 40 tilts to left or right, the drive arm 42 twists and drives the motion platform 46 rotationally to accommodate the movement. Thus, when a seat assembly, cockpit, or some other user device is attached to the motion platform 46, the device can rotate or yaw as the pivot assembly 40 tilts. As a result, in addition to a rolling effect, a yaw is also generated. The extent of yaw can be calibrated by adjusting the angle 51.

It will be appreciated that just two actuators, one on each side of a plane that bisects the assembly 40 from the substrate 14 to the motion platform 46, would be required to provide the necessary roll and yaw of the motion platform 46. An example of suitable actuators is described below, with reference to FIGS. 7-22. A linearly fixed, or non-working end of each actuator can be pivotal with two or three degrees of freedom of rotational movement with respect to the substrate 14, while a working end of each actuator can be pivotal with three degrees of freedom of rotational movement with respect to the device connected to the motion platform.

As will be seen in the embodiments described below, the substrate 14 can form part of a platform or frame, for example the drift frame described below with reference to FIG. 12, that is displaceable relative to a base. This can be used to provide additional simulated movements. In addition, a seat or similar form of carriage can be displaceable relative to the platform or frame in a limited linear fashion. This, together with the movement described above, can generate realistically consistent simulated movement with just two actuators.

Relative adjustment of the actuators, with the angle 51 suitably calibrated, can be used to customise movement of the motion platform to simulate the six different types of movement described above. Said relative adjustment of the actuators can result in movement of the virtual pivot point, discussed earlier, to provide the six different types of movement, without the need for six separate actuators. Furthermore, the motion platform can be positioned behind said component instead of underneath the component, providing significant space-saving when compared with the Stewart Platform, for example.

In FIGS. 7 to 11, reference numeral 100 generally indicates at least part of a motion simulation apparatus in accordance with an aspect of the invention. With reference to the preceding drawings, like reference numerals refer to like parts, unless otherwise specified. It is to be understood that the apparatus 100 is a working embodiment of the principles described above, with reference to FIGS. 1 to 6.

The apparatus 100 includes a base assembly 102. The base assembly 102 includes a base 104 and a drift frame 106 (FIG. 12) mounted on the base 104.

Figure 9:
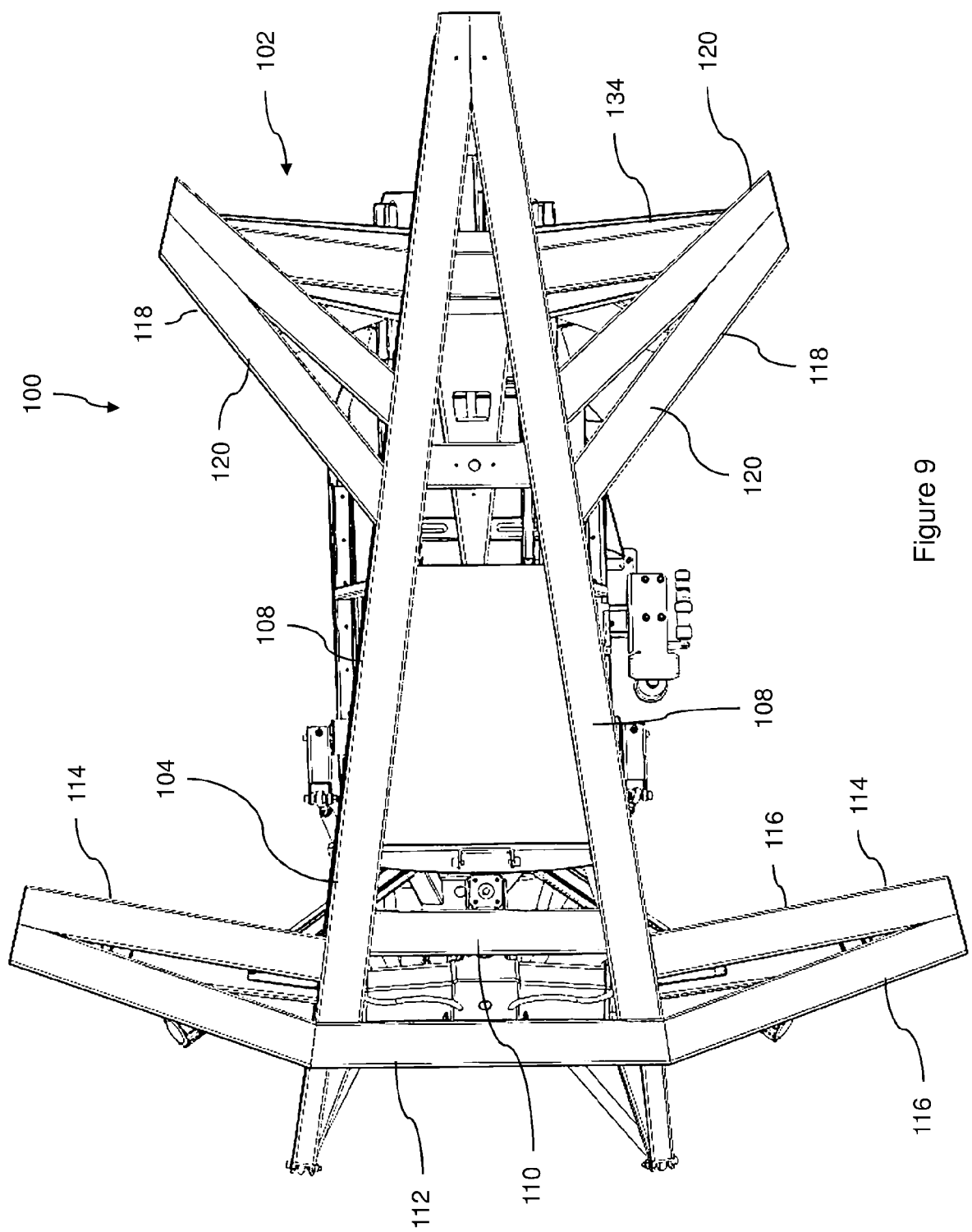
FIG. 9 shows a bottom view of the motion simulation apparatus.
Figure 10:
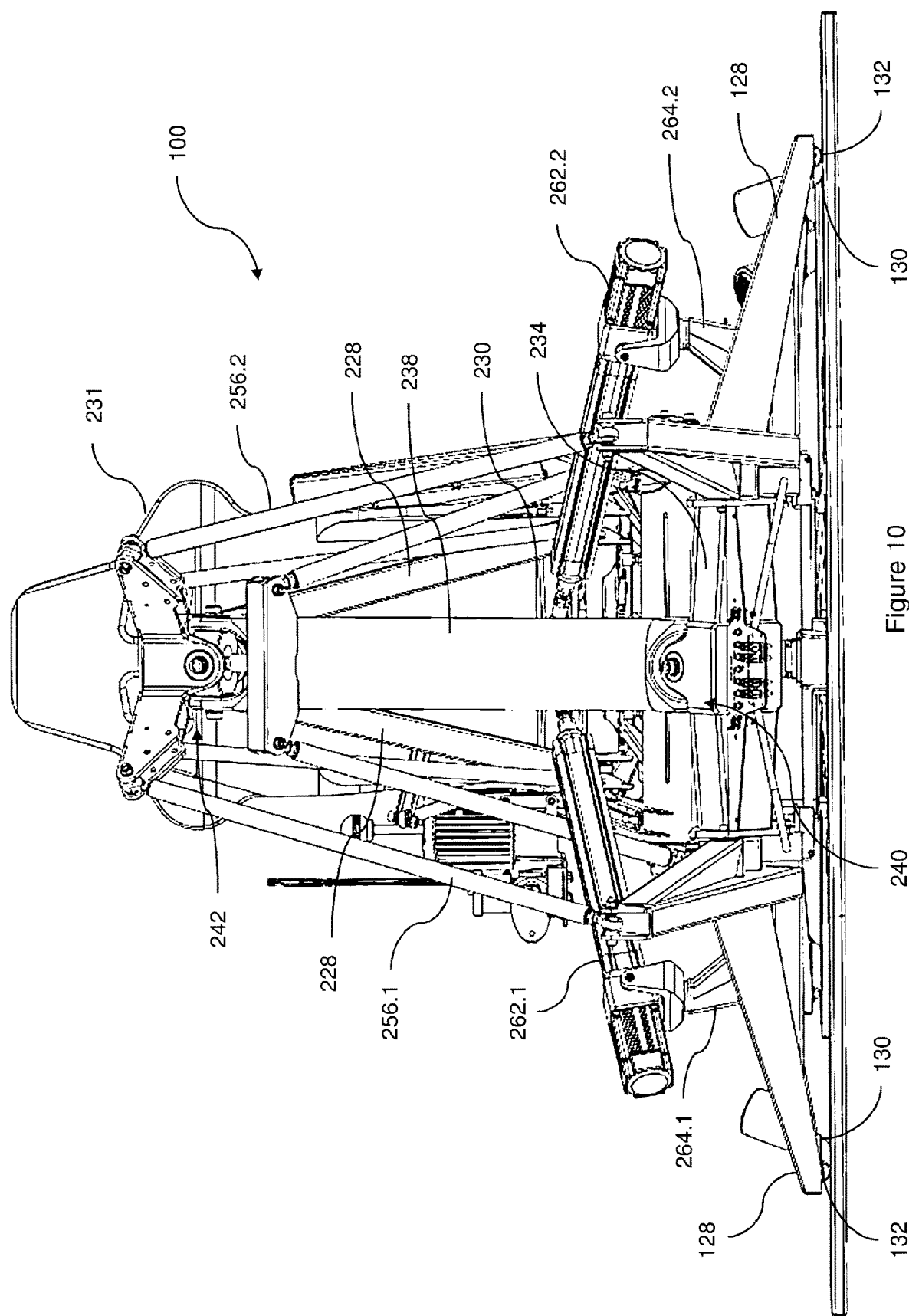
FIG. 10 shows a rear view of the motion simulation apparatus.
Figure 11:
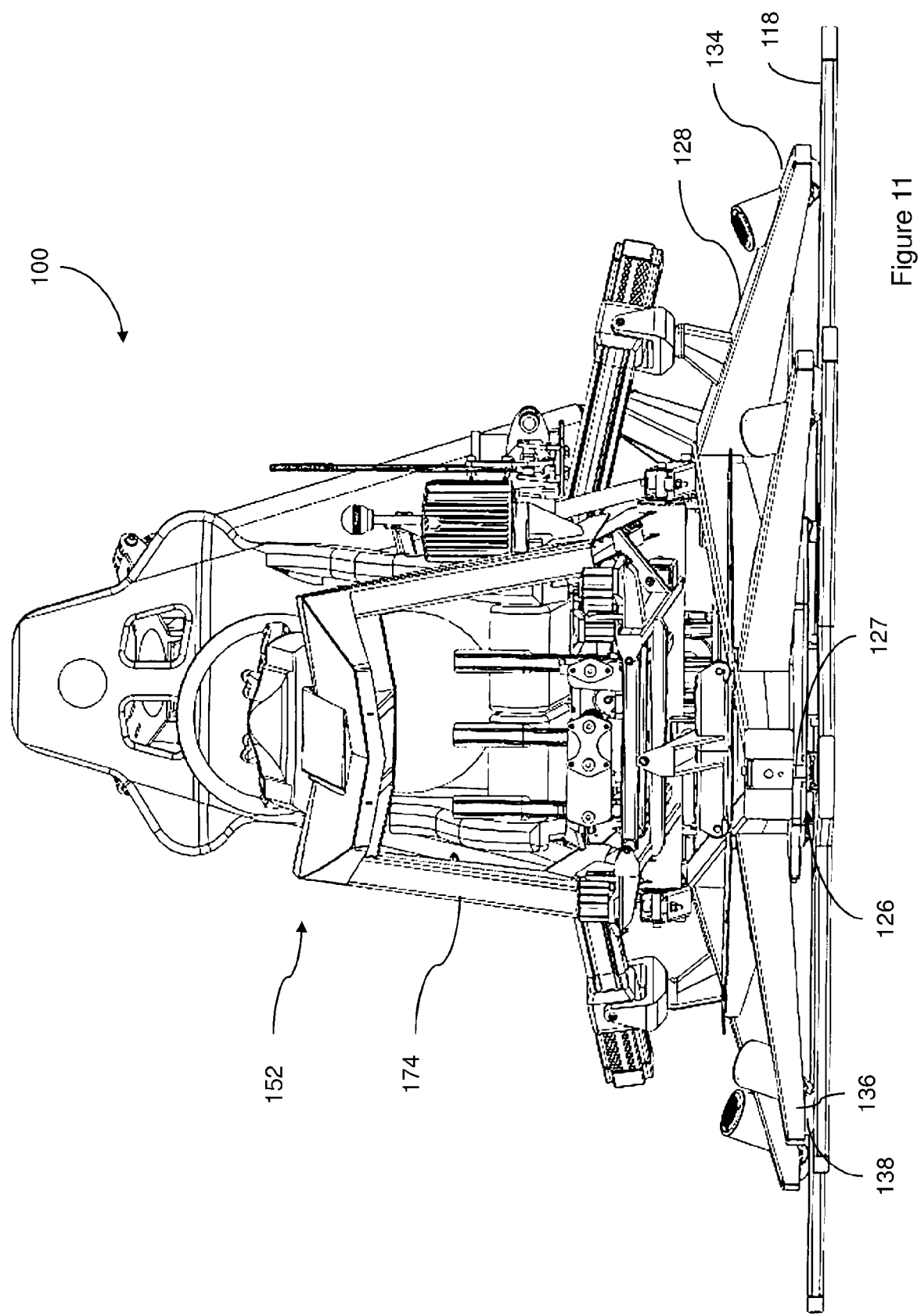
FIG. 11 shows a front view of the motion simulation apparatus.

As can be seen in FIG. 9, the base 104 include two beams 108 that converge towards each other from back to front. Front ends of the beams 108 are connected together. The beams 108 are interconnected by a rearwardly positioned crossbeam 110 and rear ends of the beams 108 are arranged on a rear crossbeam 112.

Two, opposed rear arm assemblies 114 extend from respective beams 108. Each of the arm assemblies 114 includes two arms 116 that converge as they extend from their associated beams 108.

Two, opposed front arm assemblies 118 extend from respective beams 108 forwardly of the rear arm assemblies 114. Each of the arm assemblies 118 includes two arms 120 that converge as they extend from their associated beams 108.

Each of the beams 108, crossbeams 110, 112, and arms 116 are generally rectangular in cross section and are of the same height so that the base 104 defines a generally flat upper surface suitable for supporting a roller.

The drift frame 106 (FIG. 12) includes two beams 124 that overlie the beams 108 and converge towards each other from back to front. The beams 124 are connected at their front ends by a front pivot assembly 126 (FIG. 11) that pivotally connects a front of the drift frame 106 to the base 104 so that the drift frame 106 can pivot, with respect to the base 104 generally about an apex of the base 104. The pivot assembly 126 is also configured to keep the base 104 and the drift frame 106 relatively spaced at least at the apices. The pivot assembly 126 includes a front pivot 127 (FIG. 11) that interconnects the front ends of the beams 124 and engages a bearing assembly mounted on the base 104 at the front ends of the beams 108. Thus, the drift frame 106 can pivot with one degree of freedom relative to the base 104.

The drift frame 106 includes two opposed roller mounts 128 that extend from respective beams 124 to overlie respective rear arms 116. A rear roller assembly 130 (FIG. 10) is mounted on each respective rear roller mount 128. Each rear roller assembly 130 includes a roller 132 such that each roller 132 bears against a respective arm 116. The rollers 132 are oriented so that, as the drift frame 106 pivots with respect to the base 104, the rollers 132 can roll along the arms 116.

The drift frame 106 also includes two opposed roller mounts 134 that extend from respective beams 124 to overlie respective front arms 120. A front roller assembly 136 (FIG. 11) is mounted on each respective front roller mount 134. Each front roller assembly 136 includes a roller 138 such that each roller 138 bears against a respective arm 120. The rollers 138 and the arms 120 are oriented so that as the drift frame 106 pivots with respect to the base 104, the rollers 138 can roll along the arms 120.

Figure 7:
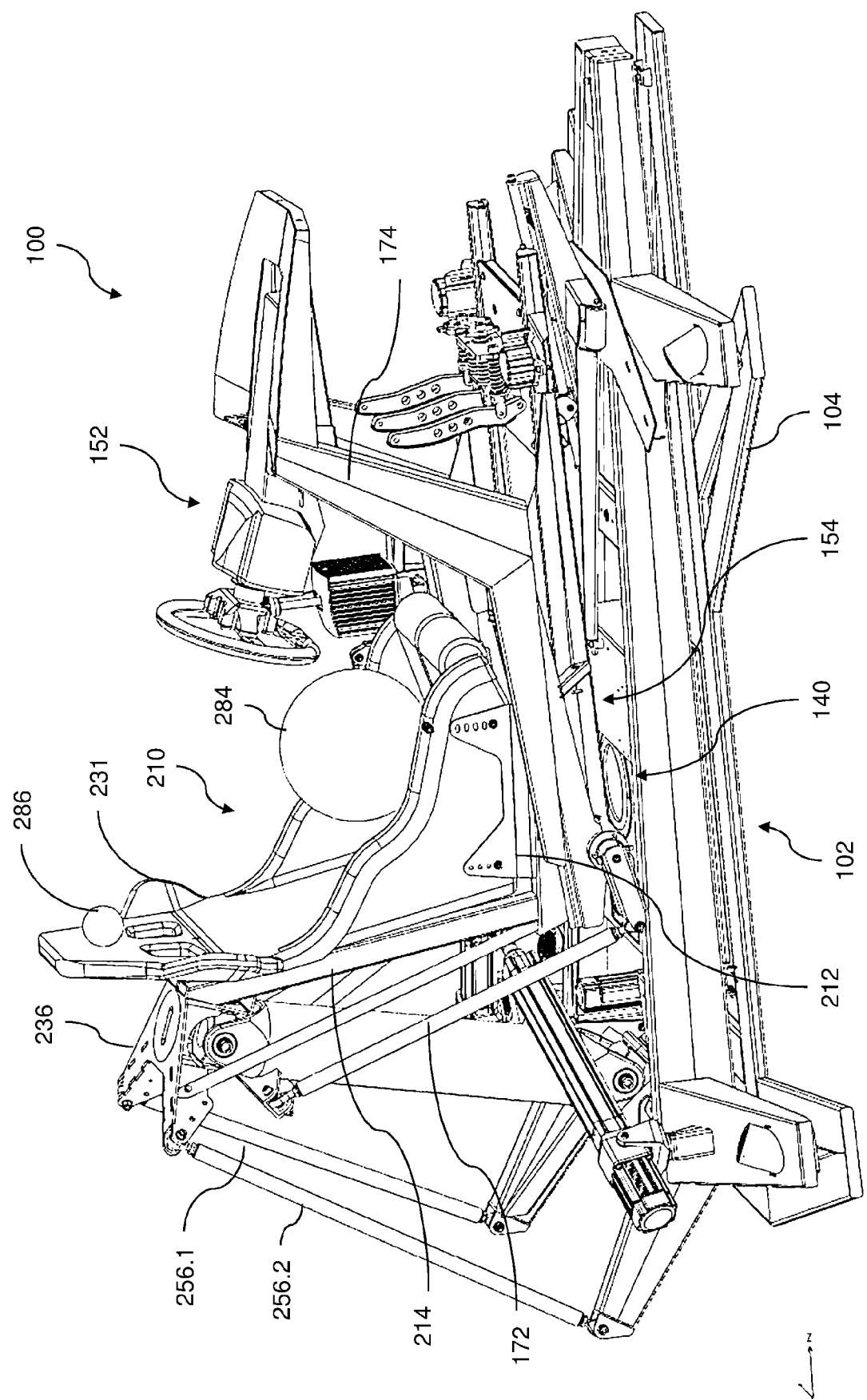
FIG. 7 shows a three-dimensional view, from a right-hand side, of a motion simulation apparatus.

A speaker assembly 140 is mounted between the beams 124 (FIG. 7).

Figure 12:
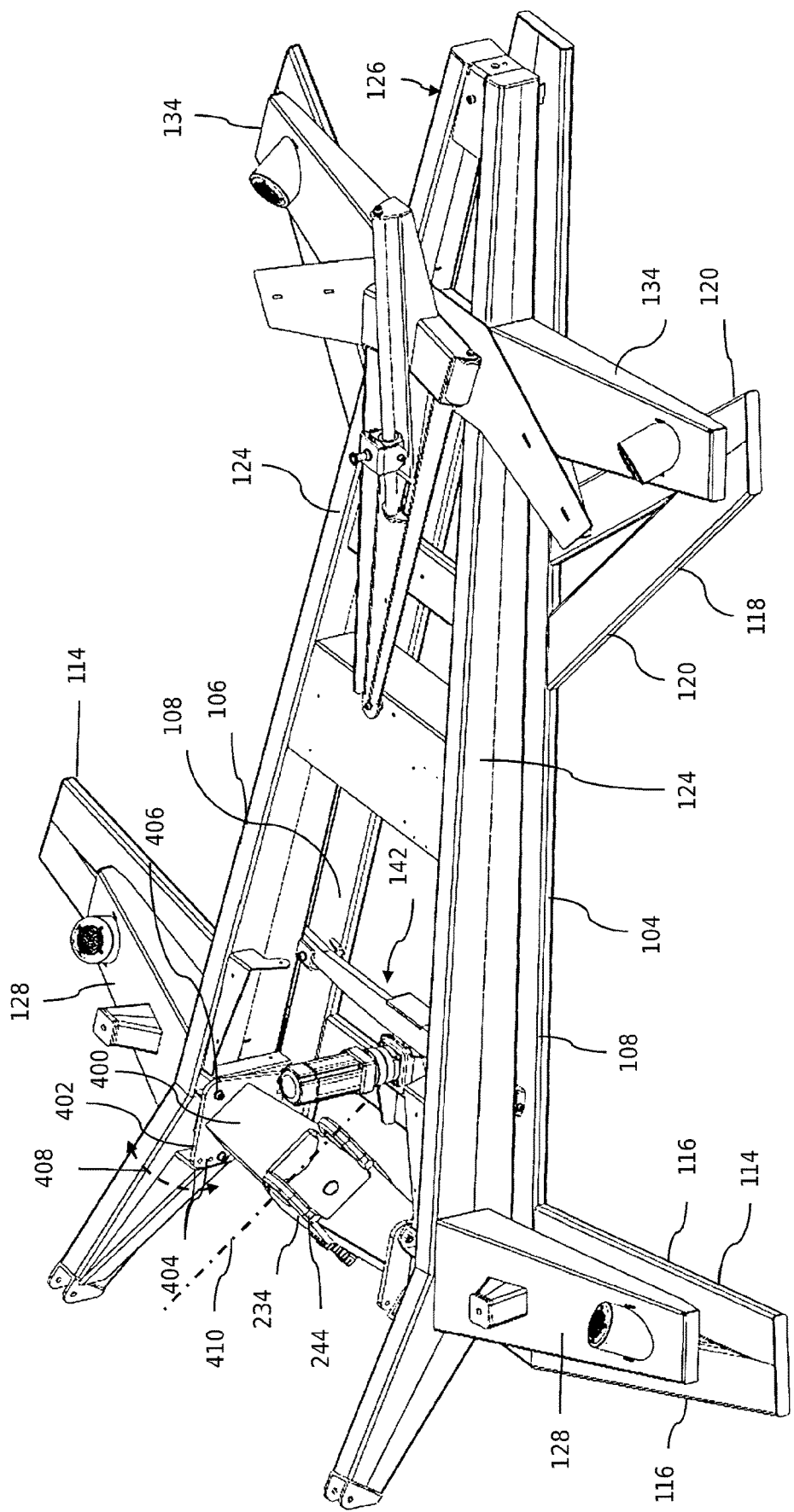
FIG. 12 shows a base assembly of the motion simulation apparatus.
Figure 13:
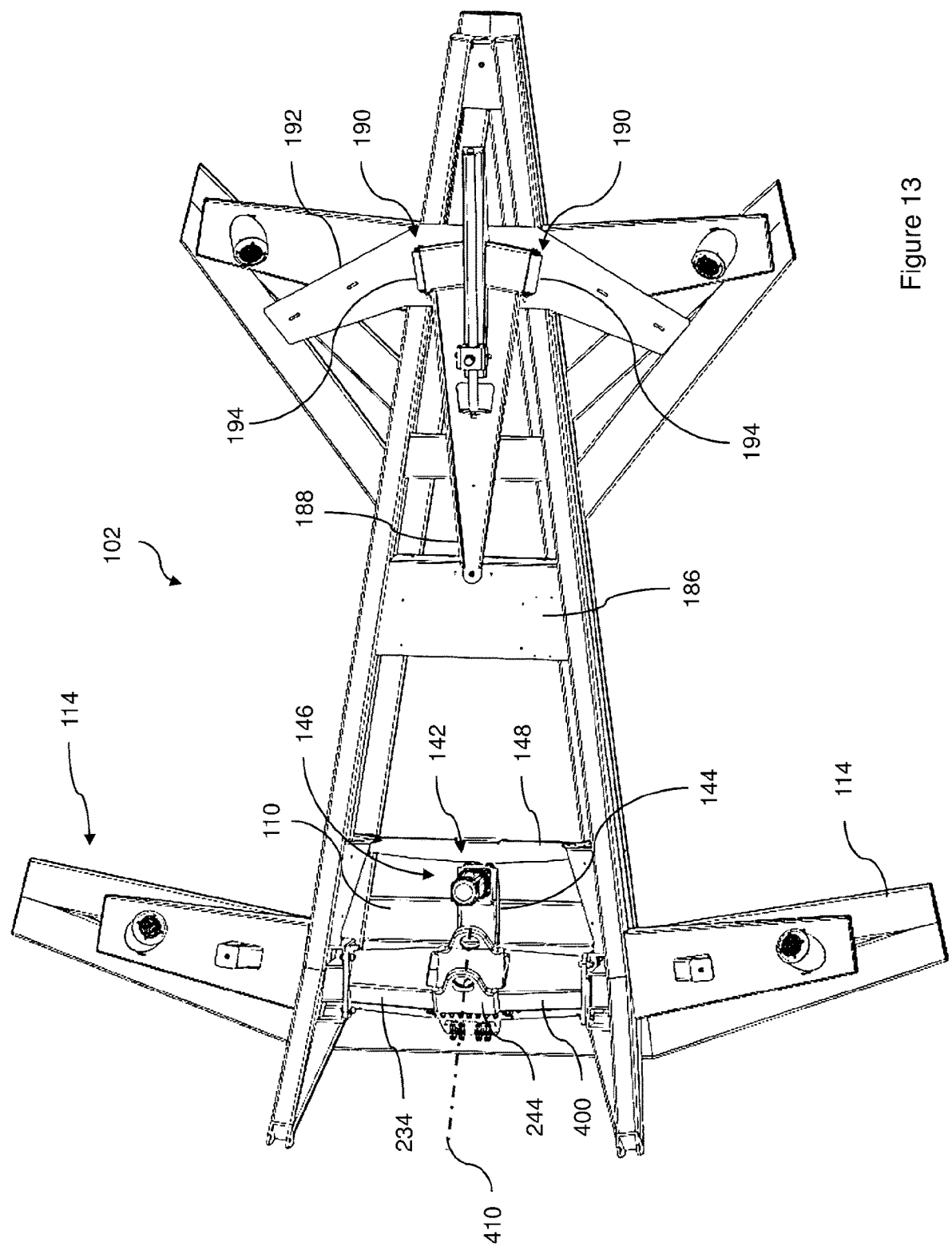
FIG. 13 shows a top view of the base assembly.

The apparatus 100 includes a drift drive mechanism 142 (FIGS. 12, 13). The drift drive mechanism 142 includes a drive assembly mount 144 that is mounted on the crossbeam 110 and extends forwardly. Detail of the drift drive mechanism 142 can be seen in FIGS. 15 and 16. A drive assembly 146 is mounted on the mount 144. The drift drive mechanism 142 includes a drift drive rail 148 that extends between and interconnects the beams 124 of the drift frame 106. The drive assembly 146 includes a pulley assembly 150 that engages the rail 148. The drive assembly 146 can be actuated so that the drift frame 106 can pivot relative to the base 104 about the front pivot assembly 126. When the apparatus 100 is used to simulate the movement of a vehicle, the mechanism 142 serves to simulate drift of the vehicle or modulate the yaw. For example, the apparatus 100 is controlled by a suitable control system so that the simulated drift can accompany other movements of the apparatus, such as roll and yaw.

A cockpit assembly 152 is mounted on the drift frame 106 (FIG. 7, for example).

Figure 17:
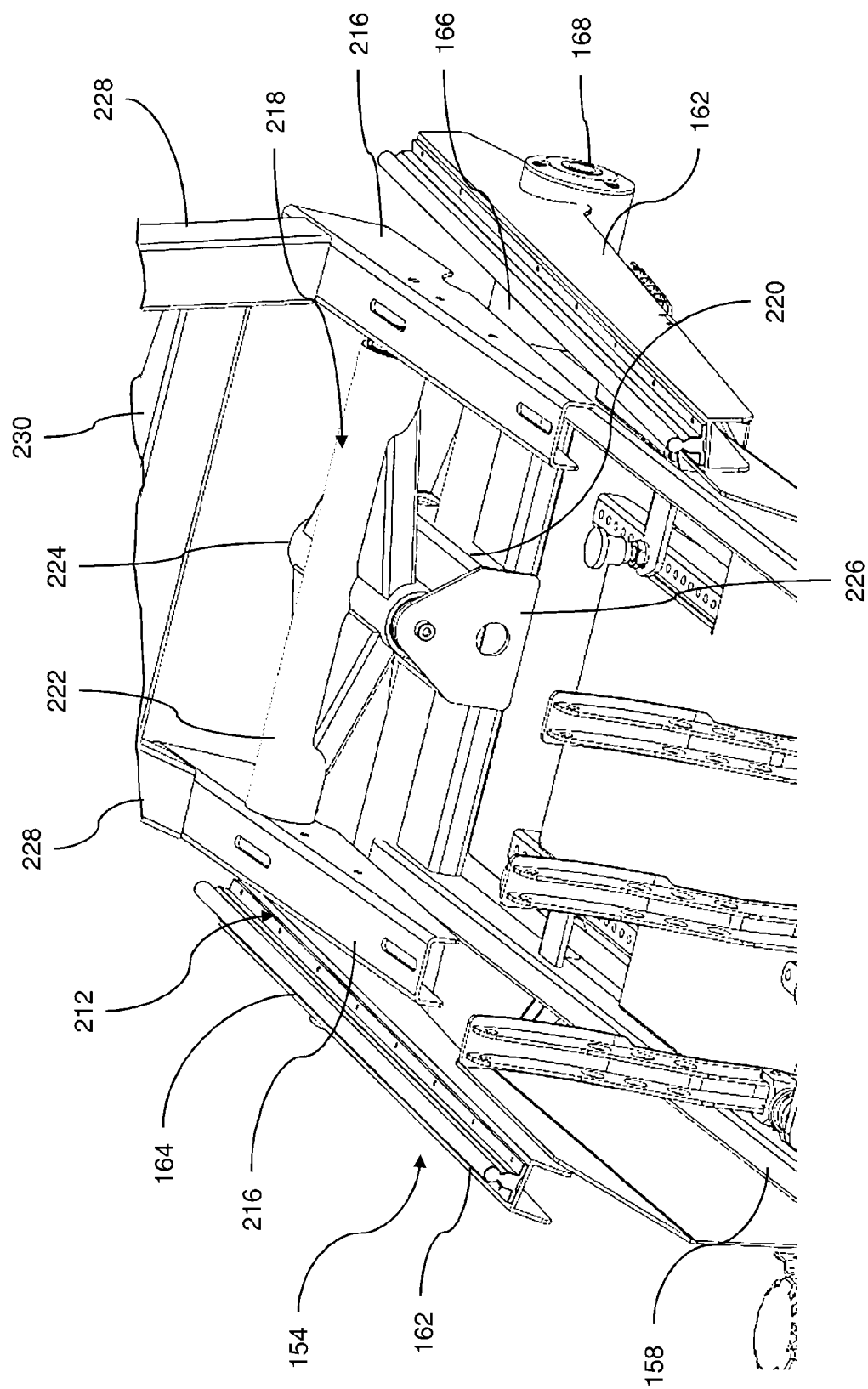
FIG. 17 shows a joint assembly for mounting a seat assembly of the motion simulation apparatus.
Figure 18:
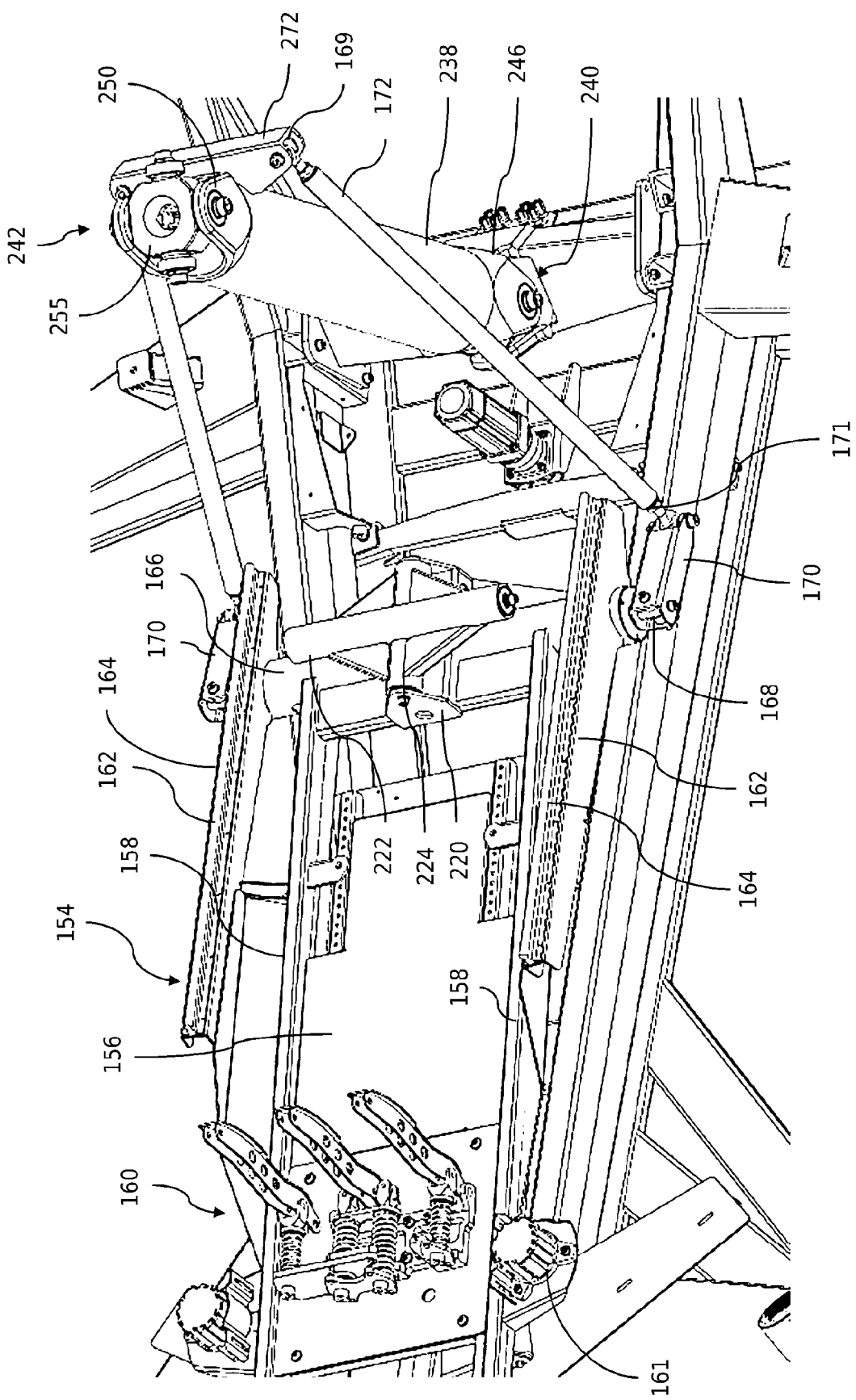
FIG. 18 shows a view, from above, of the motion simulation apparatus, without a cockpit assembly and seat assembly, for clarity.
Figure 19:
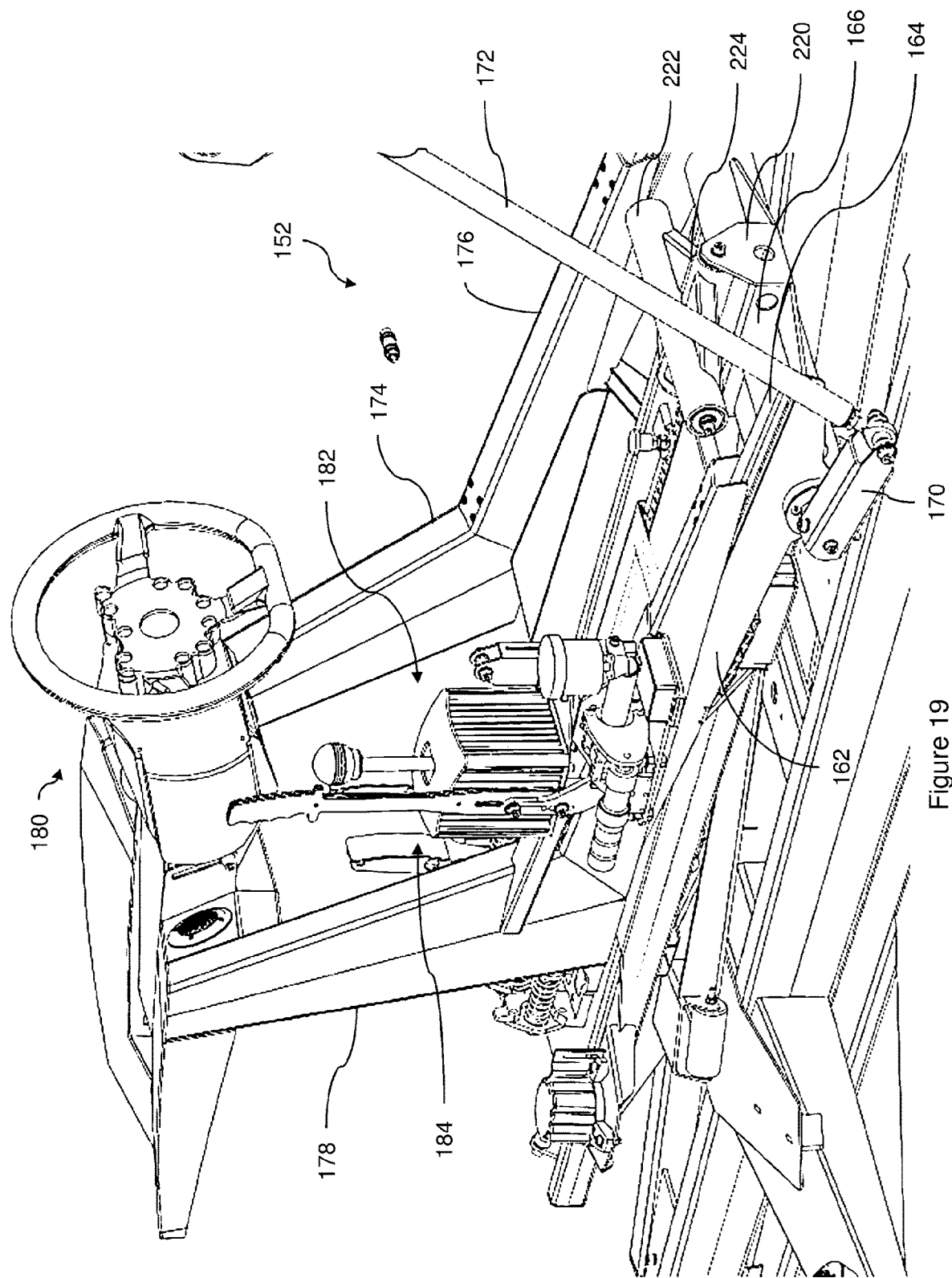
FIG. 19 shows a cockpit assembly of the motion simulation apparatus.

The cockpit assembly 152 includes a cockpit floor 154 (see FIGS. 17, 18, for example). The cockpit floor 154 includes a cross spine 166 and a pair of opposed, elongate pedal runners 158 that extend forwardly from the cross spine 166 to support a pedal assembly 160 and accessories, such as motion enhancement devices 161, known as Buttkickers (trade mark). A floor panel 156 is arranged between the pedal runners 158.

Two opposed cockpit runners 162 are fixed to, and extend forwardly from, the cross spine 166. Each cockpit runner 162 includes a linear bearing rail 164 for supporting a cockpit body 174 (FIG. 19, for example) such that the cockpit body 174 can slide, linearly, forwards and backwards relative to the cockpit floor 154. The cockpit body 174 includes two opposed guide rails 176 (FIG. 19) which engage the linear bearing rails 164, respectively.

An axle 168 extends through the spine 166 (FIG. 18). The ends of the axle 168 are connected to respective tilt arms 170, which, in turn, are connected to cockpit guide arms 172, described further below.

The cockpit body 174 further includes a control support assembly 178 (FIG. 19) arranged on and extending upwardly from the guide rails 176. The control support assembly 178 is configured to support controls of the apparatus 100, including a steering mechanism 180, a gearbox assembly 182, and a handbrake assembly 184.

A pivot mount 186 (FIGS. 13, 14) extends between the beams 124. A cockpit swing arm 188 is pivotally mounted, at a rear end, to the pivot mount 186. Two, opposed roller assemblies 190 are mounted on a front end of the swing arm 188. A swing arm runner 192 is mounted on the beams 124 and defines a generally flat surface for accommodating rollers 194, of the roller assemblies 190, so that the rollers 194 can roll along the runner 192 as the swing arm 188 swings or pivots from side to side.

A linear rail assembly 196 is mounted on the swing arm 188 to extend from a point behind the roller assemblies 190 to a point beyond the roller assemblies 190. The linear rail assembly 196 is angled upwardly from back to front relative to the swing arm 188. The linear rail assembly 196 includes a linear rail 198. A swing arm mount 200 is fastened between the rails 176. A bearing block pivot 202 is pivotally mounted on the swing arm mount 200 to pivot about an axis that is generally orthogonal to the linear rail 198. A linear bearing block 204 is mounted on the bearing block pivot 202 and the linear rail 198 is slidably received through the bearing block 204.

The apparatus 100 includes a carrier in the form of a seat assembly 210 (FIG. 7) that is arranged above the drift frame 106. The seat assembly 210 includes a seat support 212 and a back support 214.

The seat support 212 includes two support arms 216 that are spaced and extend generally from back to front (FIG. 17, for example). A joint assembly 218 interconnects the support arms 216 and the cross spline 166. Thus, the seat assembly 210 is fixed with respect to the cockpit runners 162 so that the seat assembly 210 is linearly displaceable relative to the cockpit body 174.

The joint assembly 218 includes front and rear joint braces 220 arranged on the cross spline 166. The joint assembly 218 includes an upper axle assembly 222 that interconnects the support arms 216. The joint assembly 218 includes a lower axle assembly 224 that is fixed to the upper axle assembly 222 generally orthogonally to the upper axle assembly 222. Two joint mounts 226 are mounted on respective joint braces 220. The lower axle assembly 224 interconnects the joint mounts 226. Thus, the joint assembly 218 provides relative pivotal movement of the seat support 212 and the cross spline 166 with two degrees of freedom.

The back support 214 includes two support arms 228 that extend from rear ends of respective support arms 216 (FIG. 17, for example). The support arms 228 converge operatively upwardly. A back cross brace 230 (FIG. 10, for example) extends between the support arms 228 at a location at or near a lower end of each support arm 228.

A seat 231 (FIG. 7) is fastened to the seat support 212.

A yaw mount 234 (FIG. 12, 13, 13A) is arranged between the beams 124 of the drift frame 106, at a back end of the drift frame 106. The yaw mount 234 includes a support beam 400 that extends between the beams 124. Mounting plates 402 are fixed to respective ends of the beams 124. Each mounting plate 402 defines a number of fastener or bolt holes 404 through which fasteners, such as shanks of bolts 406, can be received to fasten the mounting plates 402 to the respective beams 124. The bolt holes 404 are arranged in a suitable pattern to permit the support beam 400 to be pivoted as shown by the arrow 408. It will be appreciated that this allows an angle of axial lines 410 and 412 (FIG. 13A) to be adjusted with respect to an operative horizontal plane by selecting suitable bolt holes 404 for the fasteners 406. The purpose of this is described in further detail below.

Figure 13A:
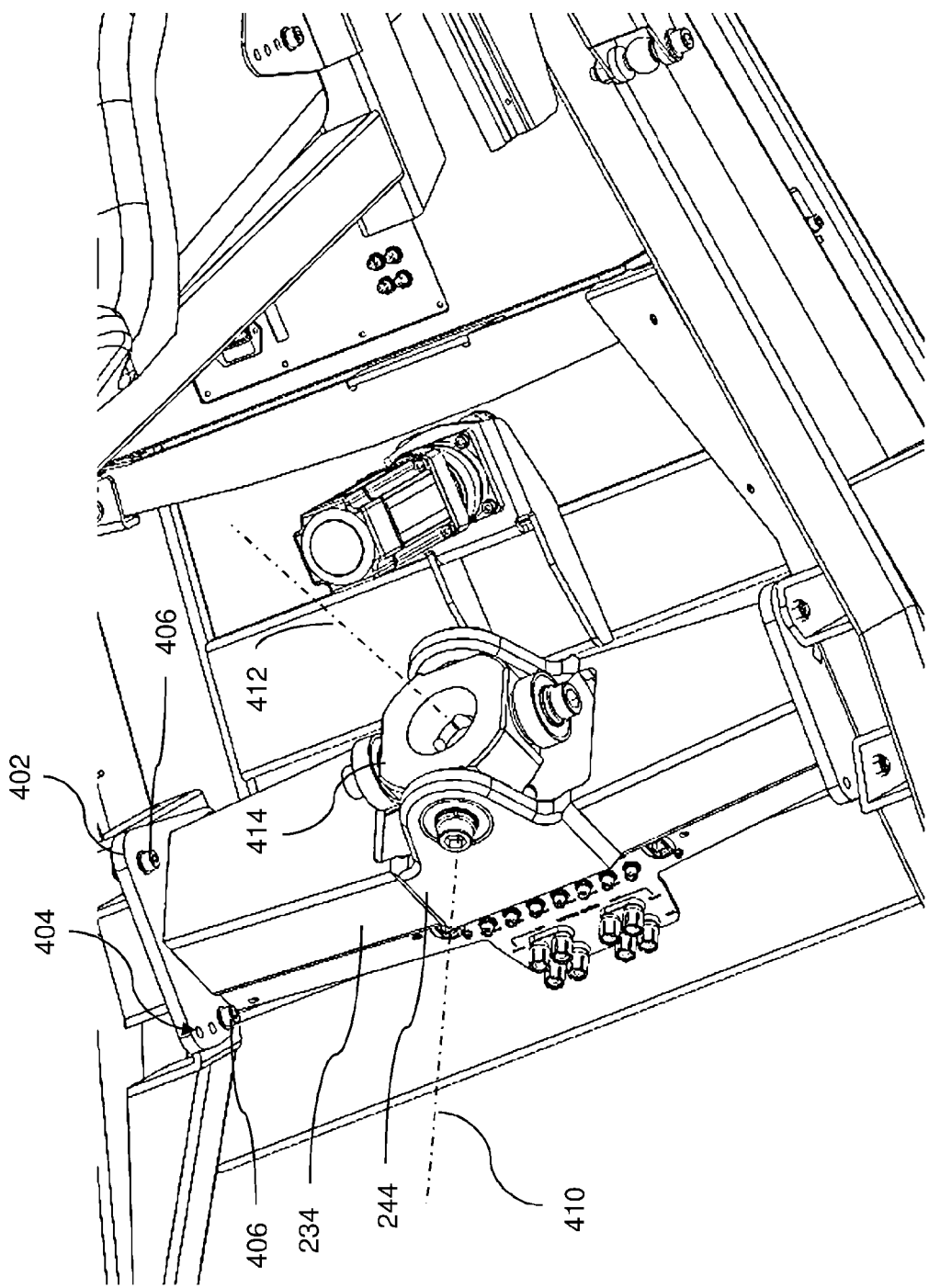
FIG. 13A is a detailed view from above of a yaw mount and associated components of the motion simulation apparatus.
Figure 14:
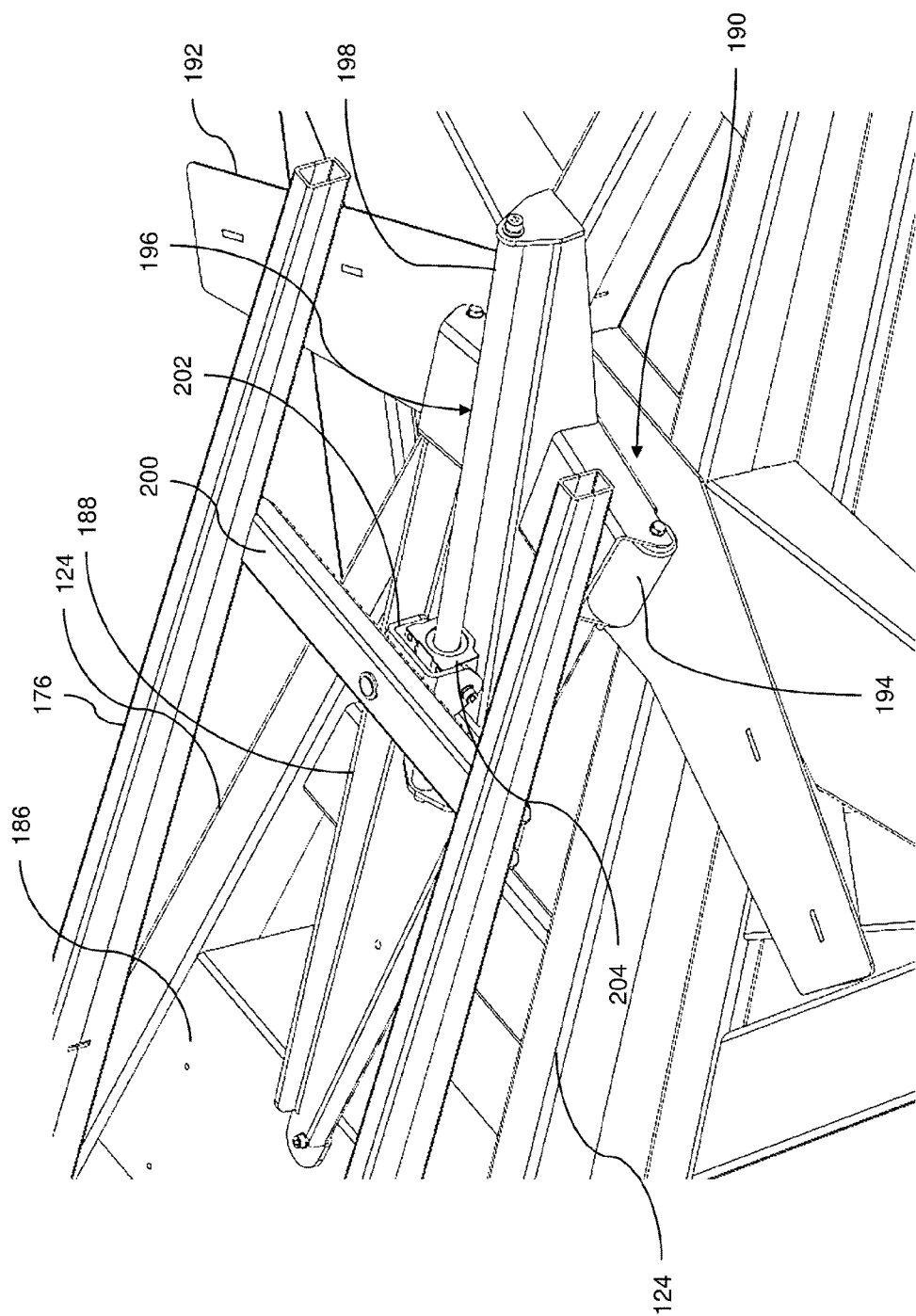
FIG. 14 shows a detailed view of part of the base assembly, including a cockpit swing arm and linear rail assembly.
Figure 16:
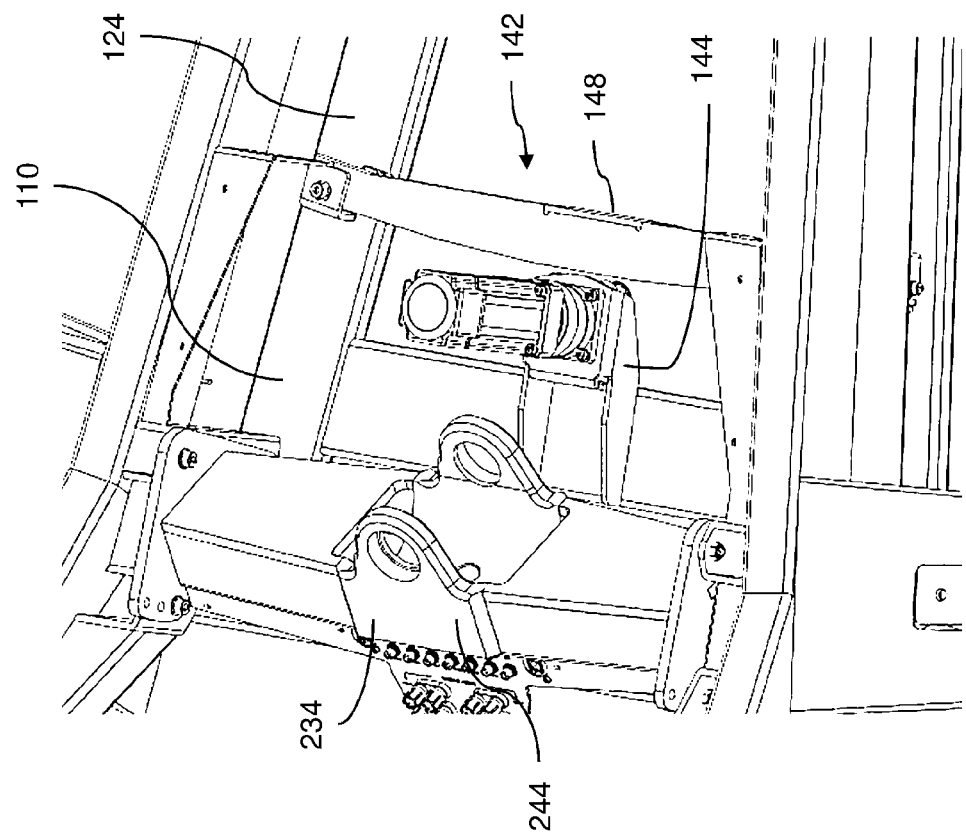
FIG. 16 shows the drift drive mechanism of the motion simulation apparatus, from above.
Figure 15:
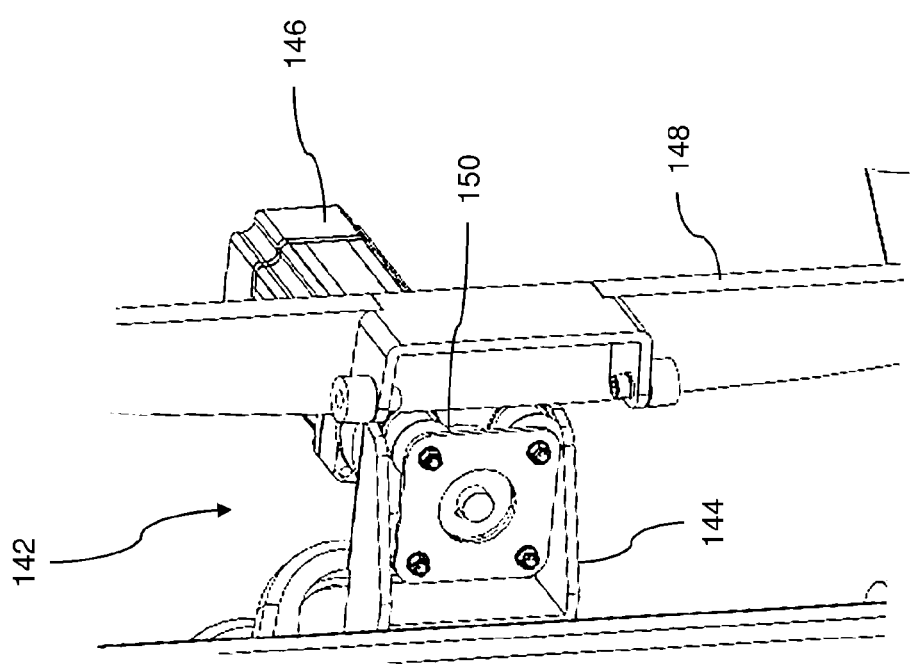
FIG. 15 shows a drift drive mechanism of the motion simulation apparatus, from below.

As can be seen in FIG. 13A, a lower spider 414 of a lower universal joint 240 (FIG. 21) is mounted in a foot yoke 244 mounted in the yaw mount 234 to permit pivotal movement of the spider 414 about the line or axis 410 and angular movement of the line or axis 412 relative to the mount 234.

Figure 21:
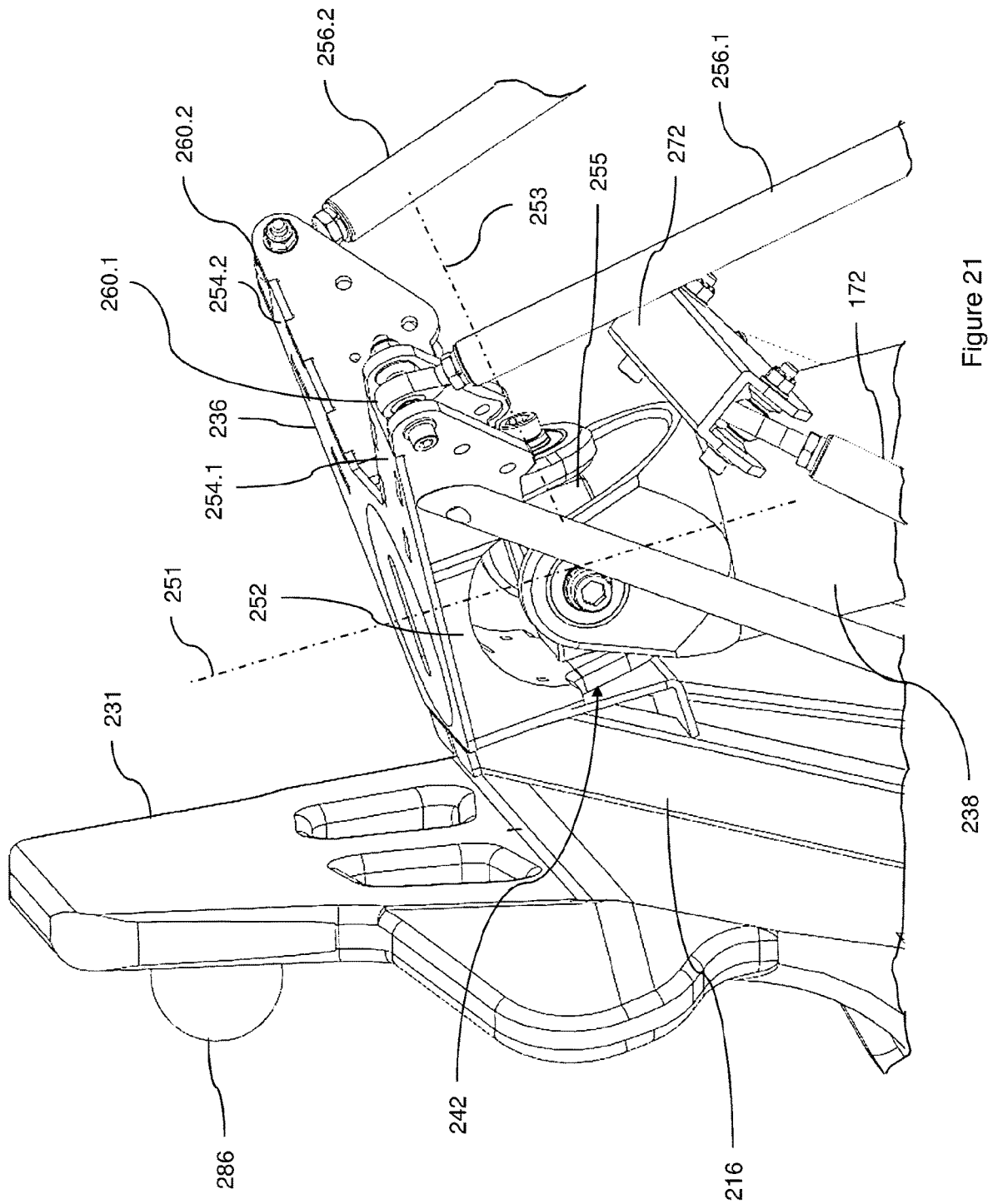
FIG. 21 shows a detailed view of a hub and part of an associated drive shaft of the motion simulation apparatus.

As can be seen in FIG. 21, a motion platform in the form of a hub 236 is mounted on an upper end of the back support 214. The hub 236 can be fixed to a head region of the back support 214.

A drive arm, in the form of a drive shaft 238 is connected, at a lower end, to the yaw mount 234 with a lower connector provided by the lower universal joint 240 and, at an upper end, to the hub 236 with an upper connector provided by an upper universal joint 242.

The joint 240 also includes a lower shaft yoke 246 (FIG. 18) mounted on a lower end of the drive shaft 238. The foot yoke 244 is connected to the shaft yoke 246 with the lower spider 414 to permit the drive shaft to pivot about the lines 410, 412. Thus, the drive shaft 238 is capable of two degrees of freedom of pivotal movement relative to the mount 234.

The upper universal joint 242 includes an upper shaft yoke 250 (FIG. 18) mounted on an upper end of the drive shaft 238. The hub 236 includes a seat yoke 252 (FIG. 21). The shaft and seat yokes 250, 252 are connected to each other with an upper spider 255, which is substantially identical to the lower spider 414, to permit the hub 236 and the drive shaft 238 to pivot relative to each other with two degrees of freedom of movement. The drive shaft 238 can rotate with respect to the hub 236 about an axis 251, and pivot with respect to the hub 236 about an axis 253 (FIG. 21).

Figure 20:
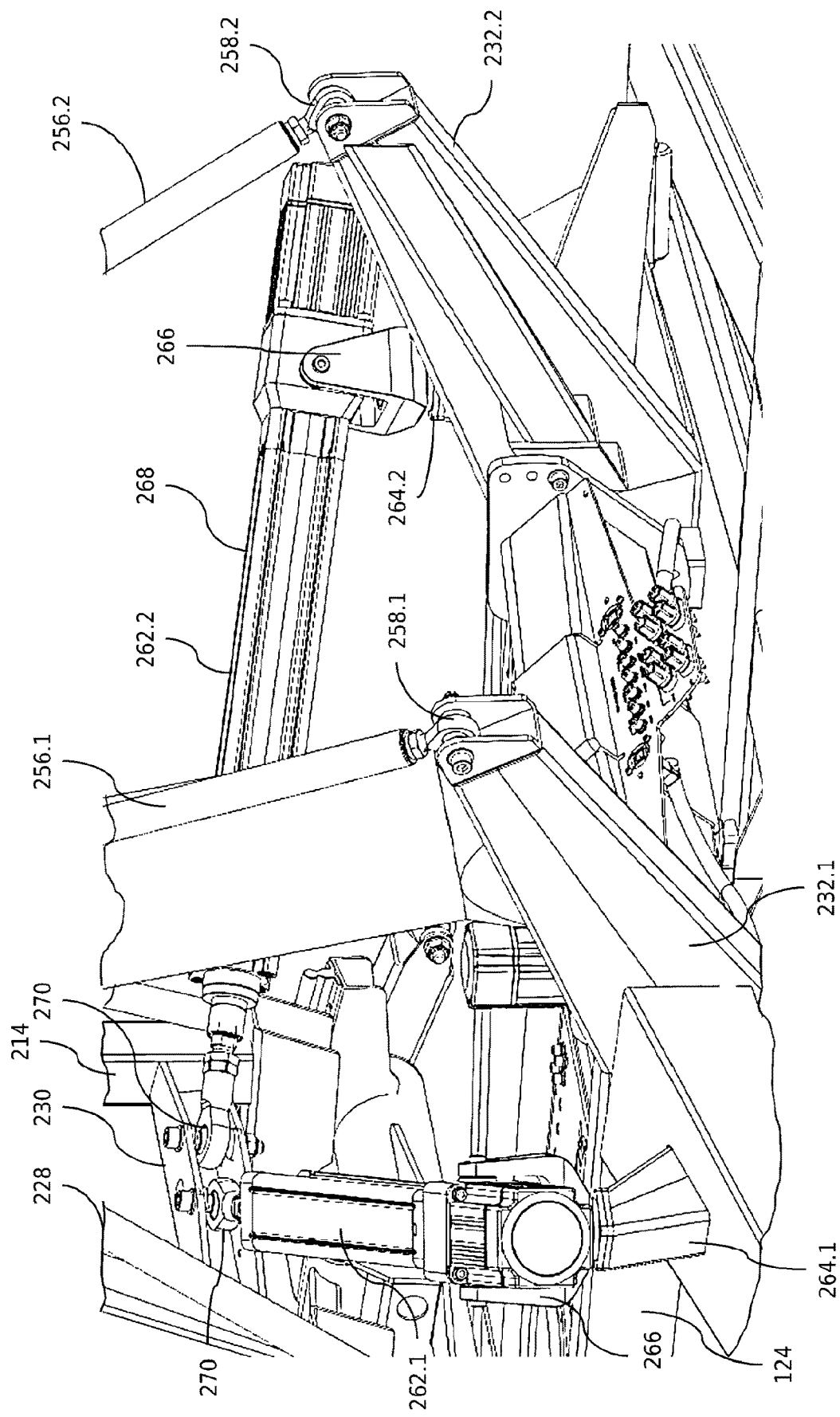
FIG. 20 shows a detailed view of part of a rear of the motion simulation apparatus.

Two brace members, in the form of a left-hand brace member 232.1 and a right-hand brace member 232.2 extend from rear ends of respective beams 124 (FIG. 20). The hub 236 includes two spaced guide mounts, in the form of a left-hand guide mount 254.1 and a right-hand guide mount 254.2 extending rearwardly from the seat yoke 252 (FIG. 21) on respective sides of the drive shaft. 238. A left-hand guide arm or strut 256.1 interconnects the left-hand brace member 232.1 and the left-hand guide mount 254.1 with lower and upper connectors provided by a lower ball joint 258.1 and an upper ball joint 260.1, respectively. A right-hand guide arm or strut 256.2 interconnects the right-hand brace member 232.2 and the right-hand guide mount 254.2 with lower and upper connectors provided by a lower ball joint 258.2 and an upper ball joint 260.2. The ball joints 258, 260 permit the struts 254, 256 to pivot, with three degrees of freedom, with respect to the hub 236 and the brace members 232. In a static, at rest condition, with the drive shaft 238 tilted neither left nor right, the drive shaft 238 is positioned in a vertical plane that bisects a dynamic frame defined by the drive shaft 238, the struts 254, 256, the hub 236 and the base assembly 102.

Figure 22:
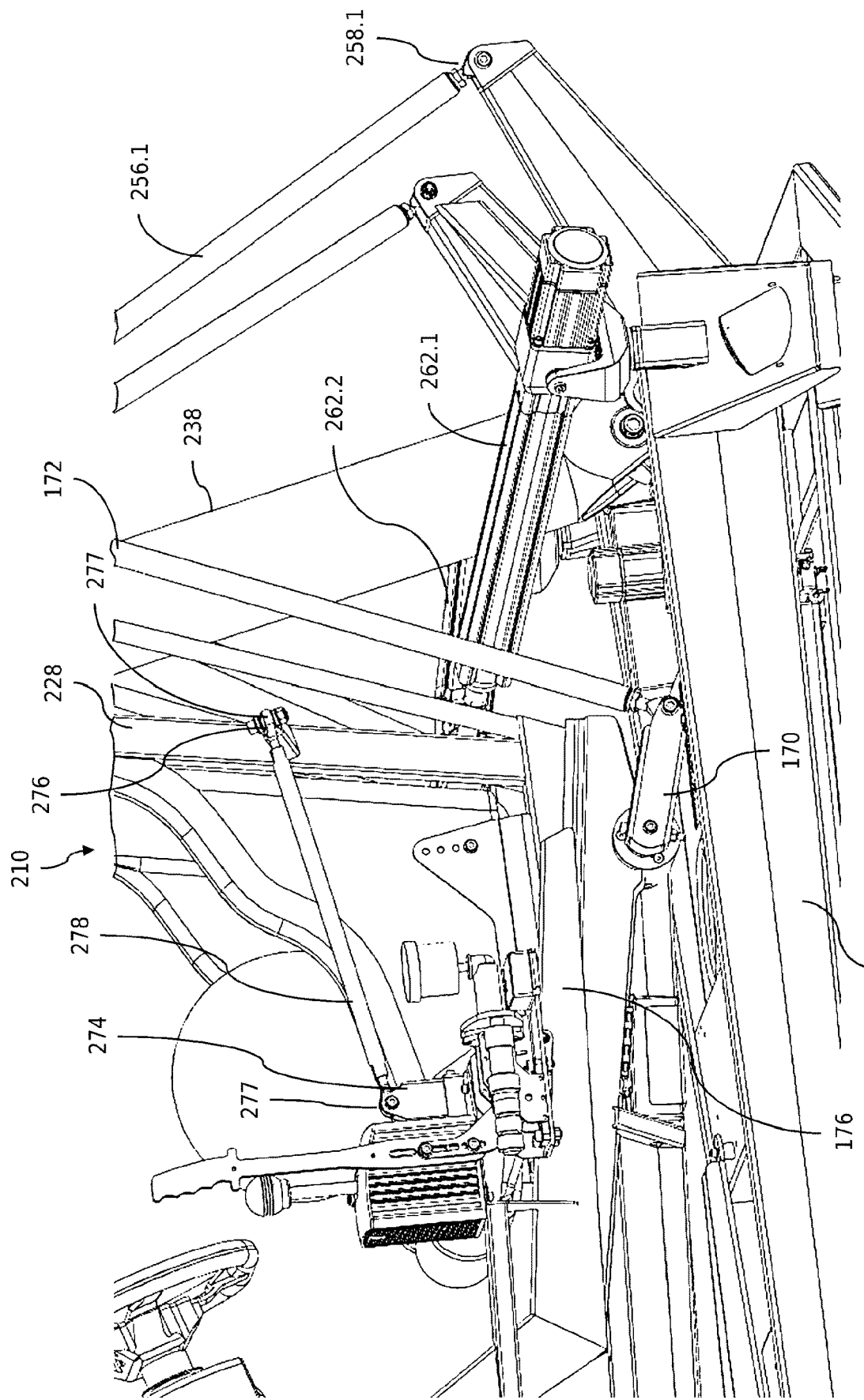
FIG. 22 shows a detailed side view of a rear of the motion simulation apparatus.

As can be seen, for example, in FIGS. 20, 22, a left-hand linear actuator 262.1 and a right-hand linear actuator 262.2 interconnect the drift frame 106 and the cross brace 230. A left-hand actuator mount 264.1 is arranged on one of the rear roller mounts 128 while a right-hand actuator mount 264.2 is arranged on the other of the rear roller mounts 128. A trunnion 266 is pivotally mounted on each mount 264. A cylinder 268 of each actuator 262 is pivotally mounted to an associated trunnion 266 so that the cylinder 268 can pivot, with two degrees of freedom, relative to the drift frame 106. Thus, the actuators 262 are positioned on respective sides of an operatively vertical plane in which the drive shaft 238 is located when the drive shaft 238 is tilted neither left nor right. Furthermore, the drive shaft 238 and the guide struts 254, 256 are interposed between the actuators 262. Thus, with reference to FIGS. 1 to 6, the arms 12, 32, 42 are interposed between the linear actuators. The actuators 262 interconnect the base assembly 102 and the seat assembly 210.

Each actuator 262 includes a piston or shaft 269 (FIG. 20) that is connected, at a working end, to the cross brace 230 via a ball joint 270. The actuators 262 converge towards each other from the roller mounts 128 to the cross brace 230. Thus, relative movement of the seat assembly 210 and the drift frame 106 is limited to two degrees of freedom of movement, which are not specifically rotational or translational.

A cockpit guide mount 272 (FIG. 18, for example) is fixed to the drive shaft 238 and extends from both sides of the drive shaft 238. An upper end of each cockpit guide arm 172 is connected to a respective end of the guide mount 272 with a ball joint 169. Each tilt arm 170 is connected to a respective lower end of each cockpit guide arm 172 with a ball joint 171. Thus, the ends of the guide arms 172 can move, with three degrees of translational freedom and two degrees of rotational freedom, relative to respective tilt arms 170 and the guide mount 272. The guide arms 172 and tilt arms 170 serve to constrain roll of the seat assembly 210.

A guide upright 274 is arranged on the left-hand guide rail 176 (FIG. 22). A cockpit guide mount 276 is mounted on a left-hand support arm 228. A left-hand cockpit guide arm or strut 278 interconnects the upright 274 and the guide mount 276 on a left-hand side, via ball joints.

The principles and manner of operation of the apparatus 100 are shown in FIGS. 23 to 26.

In FIG. 23, the schematic of FIGS. 3 to 6 is superimposed on the drive shaft 238 (drive arm 42), the guide struts 256, the base 104 and the hub 236. This illustrates that the hub 236 is constrained to move within a curved surface area in three-dimensional space. More particularly, the pivot arm 12 is equivalent to the right-hand guide strut 256.2, the pivot arm 32 is equivalent to the left-hand guide strut 256.1 and the drive arm 42 is equivalent to the drive shaft 238. The hub 236 defines the motion platform 46 and the drift frame 106 defines the substrate 14.

The lower universal joint 244 of the drive shaft 238, and the lower ball joints 258 of the guide struts 256 can be regarded as apices of a triangle 280. Similarly, the upper universal joint 242 of the drive shaft 238, and the upper ball joints 260 of the guide struts 256 can be regarded as apices of a triangle 282. The curved surface area in three-dimensional space can be spheroidal if the struts 256 and the drive shaft 238 are of similar length and the triangles 280, 282 are located in parallel planes. However, as explained above, such an arrangement will not produce the necessary yaw.

As described above, the drive shaft 238 can pivot about the axes 253, 410. It will be appreciated that such pivotal movement will not result in any rotation or twisting of the drive shaft 34 when a plane of the triangle 280 is parallel to a plane of the triangle 282. However, when the yaw mount 234 is pivotally adjusted relative to the drift frame 106, as described above, such that the axes 253, 410 are angled with respect to each other, with the planes of the triangles 280, 282, tilted relative to each other as a result of the yaw mount 234 being pivotally adjusted relative to the drift frame 106, such pivotal movement results in a rotation of the drive shaft 238 relative to the mount 234, to accommodate the relative angular orientation of the axes 253, 410, since the mount 234 is rotationally fixed about the axis 412 relative to the lower spider 414. The rotation is synchronised with, and effectively proportional to, a sway of the axis 253. This effect is commonly referred to as "phasing". Thus, a configuration of the base assembly 102 is adjustable to alter a relative angular orientation of the base assembly 102 and the hub 236 such that pivoting of the dynamic frame referred to above causes the driveshaft 238 to impart rotation to the hub 236 to simulate yaw.

This rotation of the drive shaft 238 is imparted to the hub 236 via the upper spider 255. A size of an angle defined between the axes 253, 412 will determine the extent of rotation resulting from pivotal movement of the lower spider 414, and thus the drive shaft 238, about the axis 410. Given that the seat assembly 210 is fixed to the hub 236, such rotation can be imparted to the seat assembly 210 in order to simulate yaw. Thus, an extent of such yaw can be adjusted by pivotal adjustment of the yaw mount 234 relative to the drift frame 106.

Figure 8:
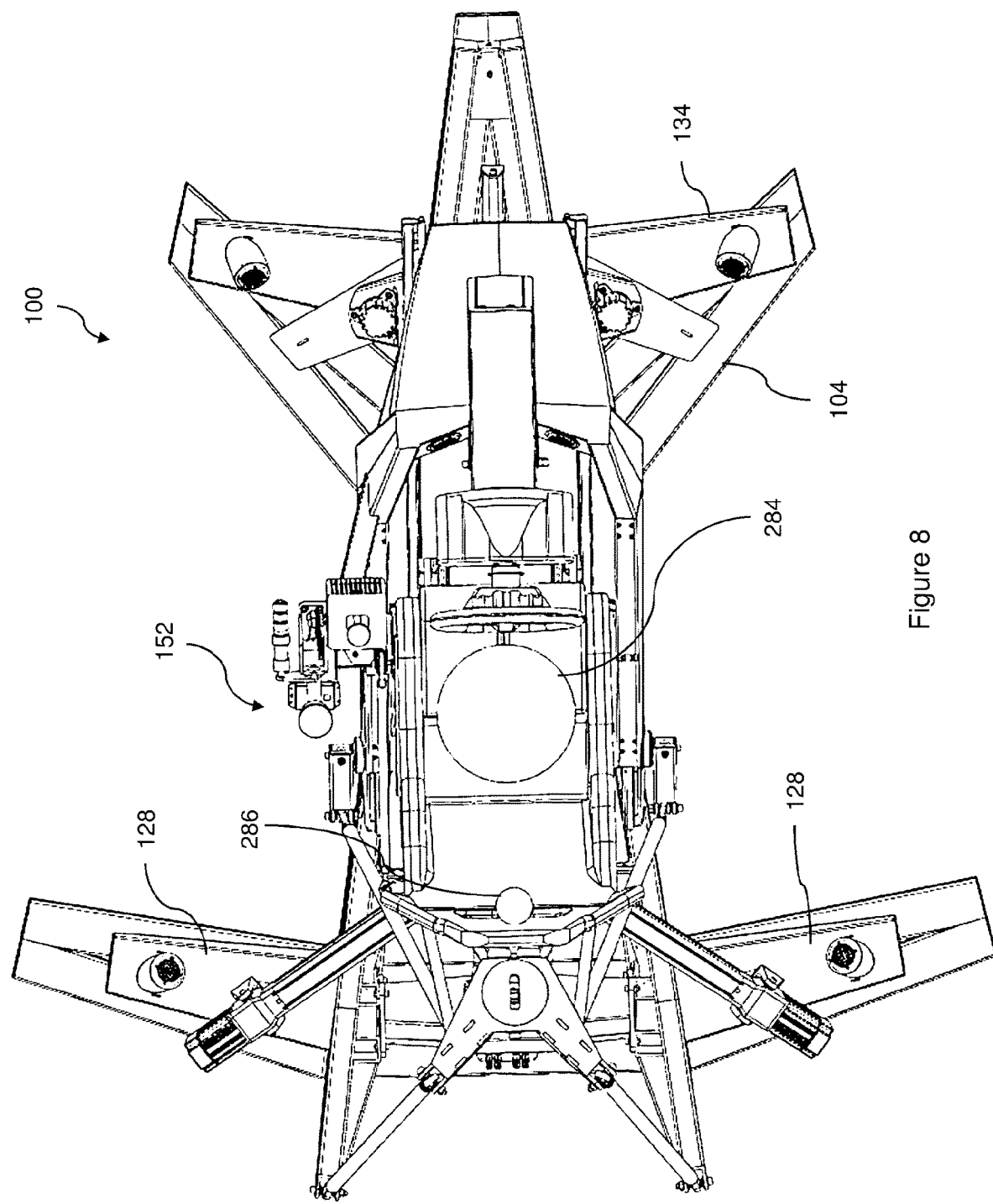
FIG. 8 shows a top view of the motion simulation apparatus.

In FIGS. 7 and 8, a region 284 is indicative of a general centre of mass of a person seated in the seat 231. Furthermore, a region 286 generally indicates a location of a vestibular system of a person seated in the seat 231.

As can be seen in the drawings, the hub 236 is positioned towards the vestibular system, slightly below the region 286. Referring back to FIG. 2, this means that the virtual pivot points are positioned above the vestibular region 286. As a result, adjustment of the pivot points within the curved surface referred to above, while the hub 234 is driven through differential operation of the actuators 262, provides a simulated movement with enhanced realism. A reason for this is that the adjustment of the pivot points can generate a certain amount of linear movement of the vestibular region in unison with pendular movement, as described above with reference to FIGS. 1 to 6.

Figure 25:
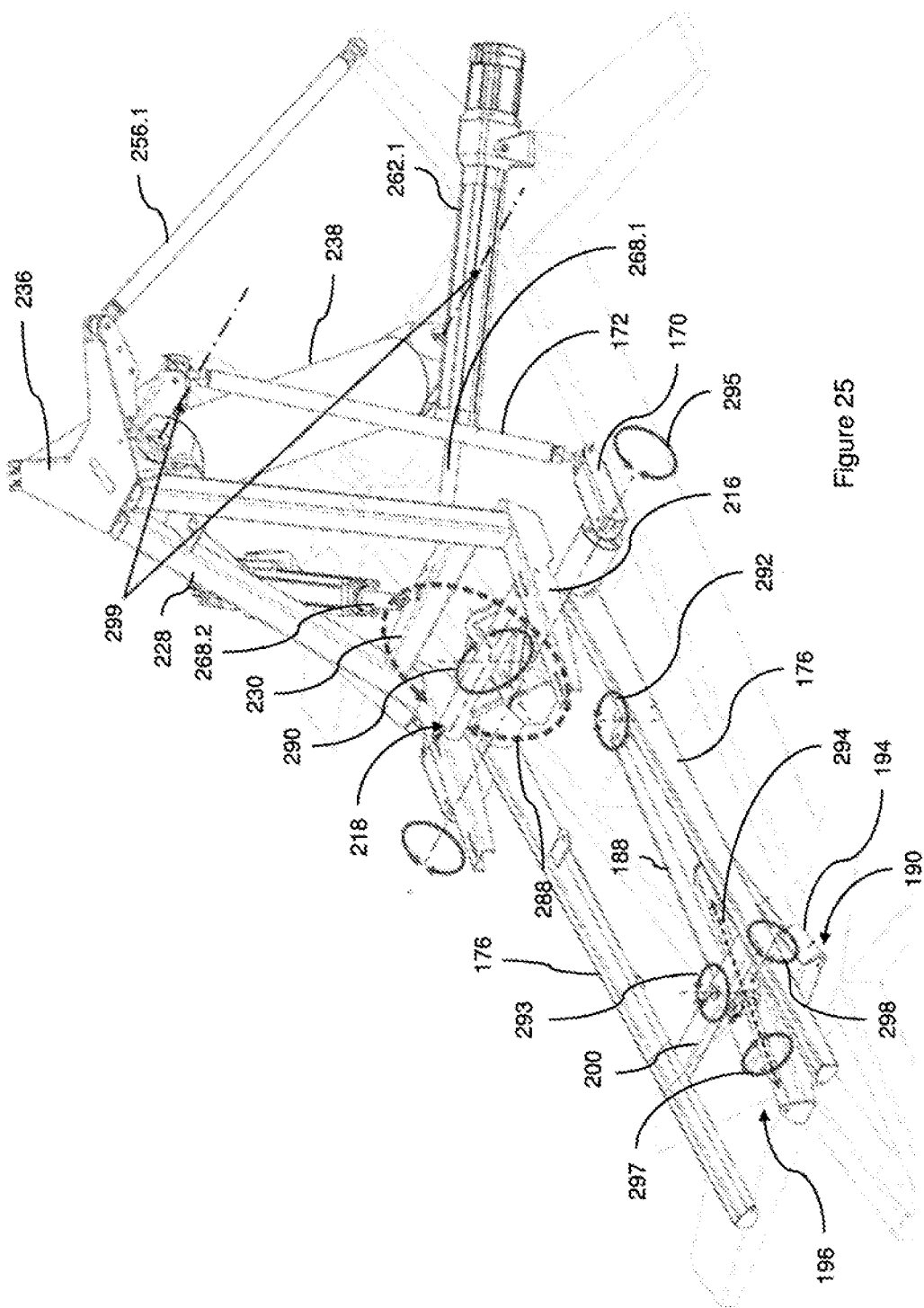
FIG. 25 shows a three-dimensional view of the motion simulation apparatus, stripped down, to illustrate various forms of movement.

FIG. 25 indicates various forms of movement that can be achieved through differential operation of the actuators 262. For example, the joint assembly 218 allows the seat assembly 210 to pivot, indicated by the dotted line 288, about an axis that extends generally upwardly through the region 284 (FIG. 7), which can be regarded as a z-axis, to accommodate a yawing motion of the seat assembly 210, generated as described above. The joint assembly 218 also allows the seat assembly 210 to pivot, indicated by the line 290, about an axis that extends along a line of simulated acceleration or deceleration that is orthogonal to the upward axis, which can be regarded as an x-axis, to generate rolling of the seat assembly 210. Such a combination of yawing and rolling could occur during the simulation of cornering by the apparatus.

The cockpit swing arm 188 can pivot, shown by a line 292, with respect to the pivot mount 186 and, as shown by a line 293, relative to the swing arm mount 200. This pivoting can be independent of the seat assembly 210 (FIG. 7) as a result of the interposed joint assembly 218. In other words, the cockpit floor 154 can pivot independently of the seat assembly 210, to a certain extent. This can help to provide realism to simulated movement, during cornering, for example, by differential positioning of controls relative to a user's limbs, as described further below.

A dotted line 294 indicates a direction of linear movement of the guide rails 176, and hence the cockpit floor 154 (FIG. 18) relative to the seat assembly 210.

Solid lines 295, 298 indicate tilting of the seat assembly 210 relative to the cockpit floor 154 as a result of operation of the actuators 262. More particularly, the curved line 295 indicates a tilting rotation at the seat assembly 210, while the curved line 298 indicates a tilting rotation accommodated by rotation of the bearing block 204.

It will be appreciated that, with differential operation of the actuators 262, the drive shaft 238 can pivot with respect to the mount 234 causing differential rotation of the tilt arms 170. This causes rolling of the cockpit floor 154, which is accommodated by relative rotation of the linear rail 198 and the swing arm mount 200, as indicated by the line 297. The guide arms 172 are inextensible. It follows that the extent of roll of the seat assembly 210 is constrained by the extent of pivotal movement accommodated by the tilt arms 170. Furthermore, with suitable adjustment of the mount 234 relative to the drift frame 106, as described above, the rolling can be accompanied by yaw to simulate cornering.

Thus, for example, if the one of the shafts 269 is extended relative to the other, the hub 236 will tilt and rotate as the drive shaft also tilts and rotates. This generates both linear, rotational and pendular movement at the vestibular region 286 which enhances realism compared to a simulation in which the linear, rotational and pendular movement are emphasised elsewhere.

The actuators 262 can also be actuated so that a forward and rearward tilting of the drive shaft 238, about the axes 299, can result in a relative displacement of the cockpit floor 154 relative to the cockpit body 174. This results in an effective shortening or lengthening of the cockpit assembly 152, thereby enhancing a simulation of deceleration or acceleration.

Figure 26:
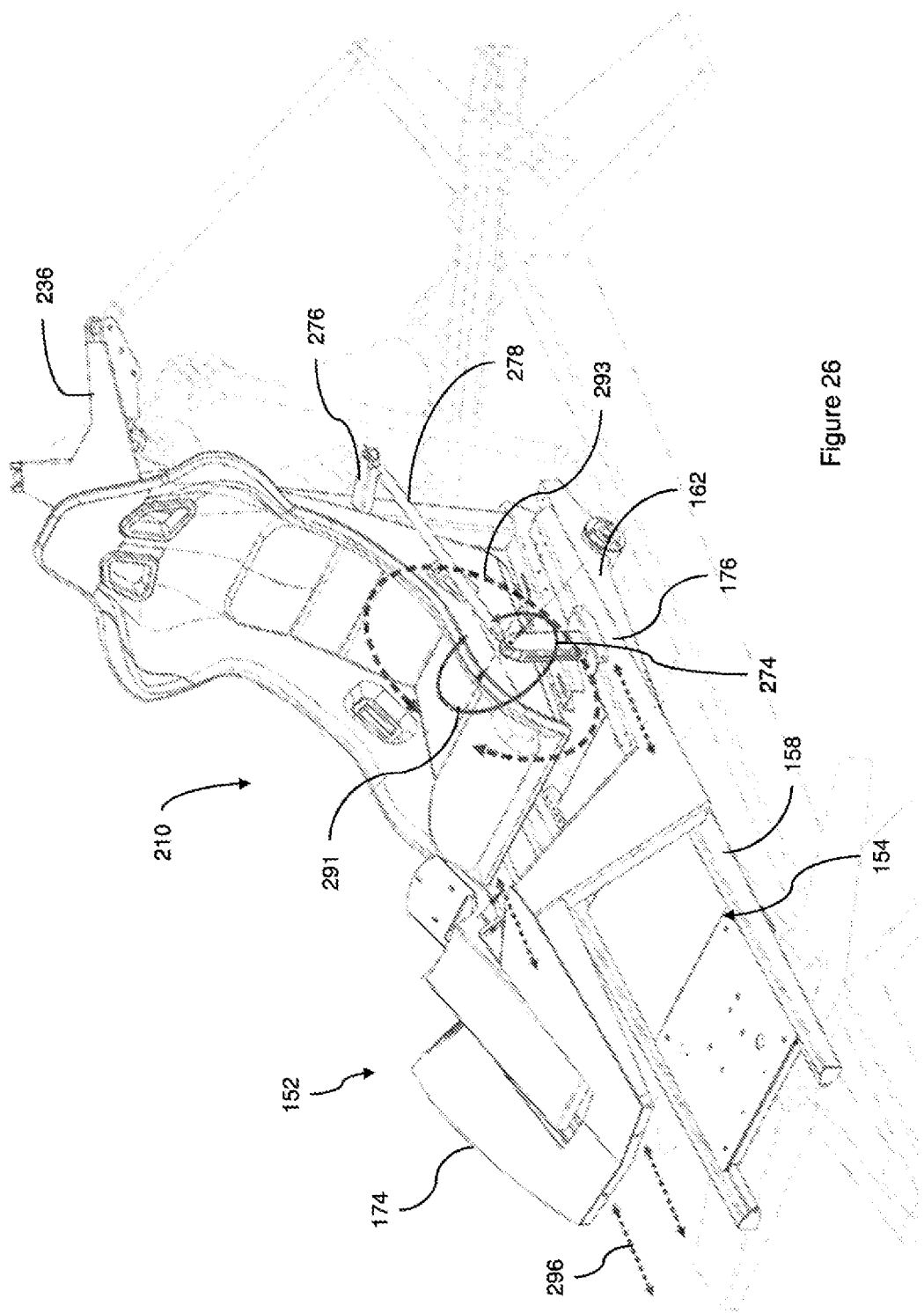
FIG. 26 shows another three-dimensional view of the motion simulation apparatus, stripped down, to illustrate further various forms of movement.

These relative movements are further illustrated in FIG. 26. For example, the straight dotted lines 296 indicate relative movement of the cockpit body 174 and the cockpit floor 154.

It will be appreciated that the joint assembly 218 allows the seat assembly 210 to pivot forwardly and backwardly to simulate pitch. This movement is guided by the cockpit guide strut 278, which can pivot about the guide upright 274 as shown with the solid curved line 291. The cockpit guide strut 278 is connected to the guide upright 274 and the guide mount 276 with opposed ball joints 277. The joint assembly 218 also allows the seat assembly 210 to pivot from side to side. This movement is also guided by the cockpit guide strut 278 in combination with the opposed ball joints. This movement is indicated by the dotted curved line 293.

The apparatus 100 defines two independent motion systems. These include a primary motion platform defined by the yaw mount 234, the drive shaft 238, the upper and lower universal joints 242, 240, and the hub 236. In particular, these components define a dynamic frame with a triangular base, three quadrilateral sides and a triangular top as described with reference to FIGS. 3 to 6. The sides of that frame are, in effect, three four-bar linkages, with two actuators each engaging a fixed (relative to the frame) mount or support at one end and, at an opposite end, respective sides of a plane that bisects the frame from the triangular top to the triangular base such that operation of the actuators results in twisting of the frame. This twisting is accommodated by suitable joint types, such as ball joints. It will be appreciated that the triangular top forms or defines a common rocker for the three four-bar linkages. This rocker is the primary simulation platform and constrains any point on it to a unique three-dimensional surface. In the various embodiments described above, the rocker is in the form of the hub 236. Thus, movement of the rocker can be imparted to the seat assembly 210 or to any other arrangement connected to the rocker.

As mentioned above, the actuators, working in combination, control and ultimately position the rocker in the three-dimensional surface. When the actuators are locked, the frame is substantially rigid.

In the primary motion platform, the drive shaft 238 can move with four degrees of freedom. This is provided by the two UV joints 242, 244 and the translational movement is provided by the drift frame 106 on which the yaw mount 234 is arranged. The two guide struts 256 can each move with five degrees of freedom. The ball joints 258, 260 at respective ends of the struts 256 provide three degrees of freedom of pivotal or rotational movement and the drift frame 106 provides two degrees of translational movement because the struts 256 extend from the brace members 232 to the hub 236. The two actuators 262 can each move with five degrees of freedom. The trunnions 266 and the ball joints 270 together provide three degrees of pivotal or rotational movement while the drift frame 106, upon which the trunnions are mounted, provide two degrees of translational movement.

Thus, the drive shaft 238 has two constraints to motion, each of the struts 256 have one constraint to motion and each of the actuators 262 have one constraint to motion. Thus, the system has six constraints to motion.

This primary motion platform also controls two subsidiary motion platforms in the form of the seat assembly 210 mounted on the joint assembly 218 such that the seat assembly 210 can pitch and yaw upon operation of the actuators 262 with the yaw mount 234 appropriately adjusted.

A secondary motion platform, in the form of the cockpit floor 154 is mechanically linked to the primary platform (hub 236) via the seat assembly 210, the cockpit runners 162, the bearing rails 164, the joint assembly 218 and the seat assembly 210. The linkage is such that the cockpit floor can move with a predictable dynamic relationship but not in unison with the primary platform. The reason for this is that the seat assembly 210 can move linearly with respect to the cockpit floor 154 as the drive shaft 238 tilts forwardly and backwardly resulting in relative tilting of the cockpit floor 154 and the seat assembly 210.

Motion of the secondary motion platform (the cockpit floor 154) is determined by movement of the swing arm 188 and operation of the joint assembly 218.

The swing arm 188 has five degrees of freedom of movement. The pivotal movement of the drift frame 106 about the front pivot assembly 126 provides one degree of freedom of rotational or pivotal movement, the linear rail assembly 196 provides two degrees of freedom of movement in the form of one translational degree of freedom of movement and one rotational degree of freedom of movement. The bearing block pivot 202 and linear bearing block 204 (FIG. 14) provide two degrees of pivotal freedom of movement. The joint assembly 218 (FIG. 17) provides two degrees of rotational freedom of movement. The ball joints 169, 171 of the guide arms 172 (FIG. 18) provide three degrees of freedom of movement while the cockpit guide strut 278 (FIG. 22) provides five degrees of freedom of movement.

Thus, the swing arm 188 has one constraint to motion, the joint assembly 218 has four constraints to motion and the guide arms 172 and guide strut 278 have one constraint to motion.

A tertiary motion platform (the control support assembly 178 in FIG. 19) is mechanically linked to the primary motion platform and secondary motion platform such that it moves with a predictable dynamic relationship with both the primary and secondary motion platforms but not in unison with either.

The motion of the tertiary motion platform is determined by the cockpit guide strut 278 (FIG. 22) and the guide rails 176, 162. The cockpit guide strut 278 has five degrees of freedom of movement in the form of three rotational degrees of freedom of movement provided by the ball joints 274, 276 and two degrees of translational freedom of movement because the control support assembly 178 is linked to the seat assembly 210 by the guide strut 278 being connected to a support arm 228. The linear slide arrangement provided by the guide rails 176, 162 provides one degree of translational freedom of movement.

Thus, the constraints to motion of the tertiary motion platform include one provided by the cockpit guide strut 278 and five provided by the guide rails 176, 162.

Figure 27:
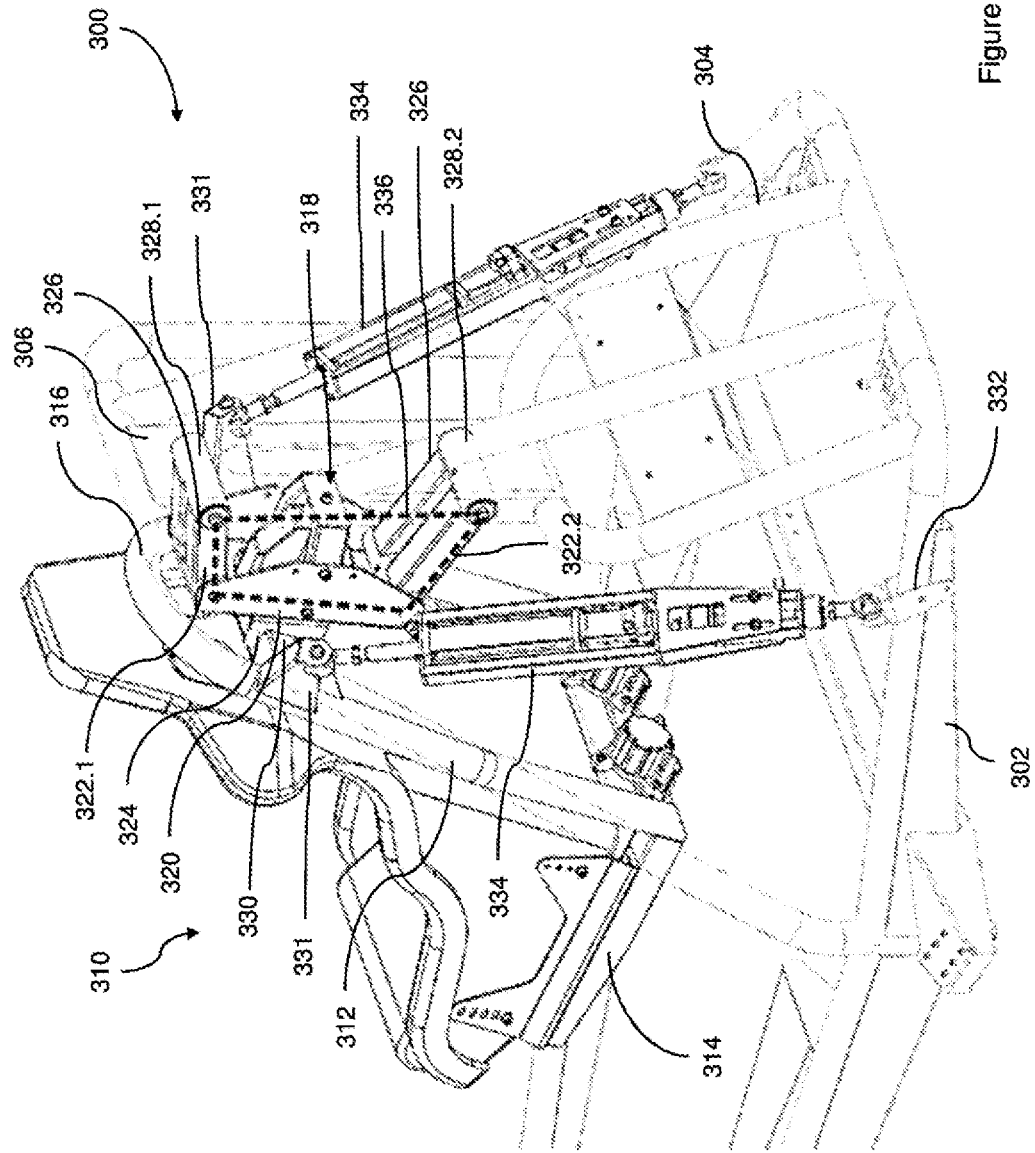
FIG. 27 shows a simplified rear view of another embodiment of a motion simulation apparatus.

In FIG. 27, reference numeral 300 generally indicates a further embodiment of a motion simulation apparatus. With reference to the preceding drawings, like reference numerals refer to like parts, unless otherwise specified.

In this example, there is provided a base 302. A support structure 304 extends upwardly from a rear of the base 302. The support structure 304 includes a rear support 306 on which an upper bearing assembly 328.1 and a lower bearing assembly 328.2 are mounted. A carrier 326 is mounted on the rear support 306 with the bearing assemblies 328. The carrier 326 includes a cradle 320. An upper carrier arm 322.1 is pivotally connected to the cradle 320 at one end and pivotally connected to the rear support 306 with the upper bearing assembly 328.1 at an opposite end. A lower carrier arm 322.2 is pivotally connected to the cradle 320 at one end and pivotally connected to the rear support 306 with the lower bearing assembly 328.2 at an opposite end.

The motion simulation apparatus 300 includes a seat assembly 310. The seat assembly 310 includes a seat frame 312. The seat frame 312 includes a seat support 314 and a seat back 316.

A stub axle assembly 318 interconnects the seat back 316 and the cradle 320. The stub axle assembly 318 includes an axle mount 330 that is fixed to the cradle 320. A carriage 324 interconnects the seat support 314 and an axle of the assembly 318 so that the seat assembly 310 can pivot about an x-axis with respect to the carrier 326.

It will be appreciated that this configuration defines a four-bar linkage or dynamic frame as indicated by the dotted lines 336. The linkage 336, in operation, can provide a virtual pivot point above a vestibular region of a user. The purpose of the virtual pivot point is described above with reference to the apparatus 100. However, the virtual pivot point is not necessarily always above the head. The upper arm 322.1 serves to keep the seat back 316 generally parallel with the cradle 320. The geometry defined by this arrangement also provides other stability advantages. For example, the linkage is self-centering because a mid-point has the lowest state of potential energy. This reduces power requirements of the actuators described below.

Two upper actuator mounts 331 are arranged on the seat back 316 on respective sides of the cradle 320. Two lower actuator mounts 332 are arranged on the base 302, also on respective sides of the support structure 304. An actuator 334 is mounted between each pair of upper and lower mounts 330, 332, with ball joints, on respective sides of the cradle 320, so that the actuators 334 have three degrees of freedom of rotation relative to the seat frame 312 and the base 302, at their respective ends.

Operation of the actuators 334 causes tilting or distortion of the linkage 336 and rotation of the of the carriage 324 relative to the cradle 320. For example, forward pivoting (or anticlockwise rotation from a left side view) of the arms 322 causes clockwise rotation of the cradle 320 with the virtual pivot point moving down from above the head (when simulating full braking) and to a region about a user's stomach (when simulating full acceleration). Also, differential operation of the actuators 334 can cause rotation of the carriage 324 relative to the cradle 320. Thus, suitable operation of the actuators 334 can cause movement of the seat assembly 310 relative to the base to simulate the six types of movement described above.

It is envisaged that various other forms of dynamic frames or four-bar linkages can be achieved with different configurations.

In motion simulation apparatus, transitions from linear acceleration to virtual acceleration should occur without the detection of force vectors directed oppositely to those intended for simulation. In simple terms, if the required acceleration is in one particular direction, then it is necessary to generate an initial acceleration in that direction from a current frame of reference to reach the required position or orientation for the initiation of virtual acceleration. As set out above, a virtual pivot point is displaced during pivotal movement about the virtual pivot point. The position of the vestibular region 286 is such that this displacement of the virtual pivot point results in the vestibular region 286 experiencing a linear displacement This is applicable only for lateral accelerations.

Apart from the drift movement, generated by the drift drive mechanism 142, all other movements of the seat assembly 210 are generated by just the two actuators 262. This is to be considered in contrast to the Stewart platform, described above, which requires six prismatic actuators and accommodation for the actuators underneath the seat or motion platform.

To place the movements below into context, the definitions of the six types of movement set out in the background should be considered.

For example, for acceleration and braking, the actuators 262 can be actuated simultaneously and non-differentially to produce an initial extent of linear acceleration which is subsequently swapped out to pitch, as described above. More particularly, the virtual pivot point is initially shifted forwardly or backwardly prior to the initiation of the pendular motion, in the same direction, of the vestibular region 286. The initial actuation can result in relative displacement of the cockpit floor 154 and the seat assembly 210. Where the cockpit floor 154 and seat assembly 210 are displaced away from each other, for example, with the simultaneous extension of the shafts 269, the simulation of acceleration is enhanced. Similarly, where the cockpit floor 154 and the seat assembly 210 are displaced towards each other, for example, with the simultaneous extraction of the shafts 269, the simulation of deceleration is enhanced. This relative movement of the cockpit floor 154 and the seat assembly 210 stimulates the user's proprioceptive system (perception of kinematic relationships between body parts). This enhances realism. Furthermore, given that the user will be holding a steering wheel and possibly other controls that are connected to the cockpit floor 154 by the cockpit body 174, those components will be either pulled away from the user to mimic the initial forces of acceleration or will be pushed towards the user to mimic the initial forces of deceleration.

To simulate cornering, the actuators 262 can be actuated differentially to generate sway and yaw of the vestibular region 286. As explained above, both motions are effectively simulated by an initial displacement of the virtual pivot point in the direction of cornering as result of the differential actuation of the actuators 262. As above, the initial linear displacement transitions to the pendular movement. The cornering is further simulated by the actuators 262 being further used to simulate sway, which would result out of sustained cornering. The yaw referred to above is used together with visual input and body distortion resulting from relative movement of the seat assembly 210, the cockpit floor 154 and the pedal assembly 160 to result in an interpretation of roll (which is not perceptively desirable) as sway.

As with linear acceleration and deceleration, under cornering, the seat assembly 210 and the cockpit floor 154 can also be pivotally displaced relative to each other as described with reference to FIGS. 25 and 26. The hand controls, under cornering, can be moved further in the direction of the turn than the driver to mimic the centrifugal forces of cornering that push the arms away from the turn. Similarly, the pedal assembly 160 mounted on the pedal runners 158 are moved further in the direction of the turn then the driver to mimic the centrifugal forces of cornering that push the legs away from the turn. In addition, as a result of the relative tilting described above, the cockpit floor 154 is tilted towards the turn more gently than the seat assembly resulting in additional pressure to the foot on the outside of the turn and reduced pressure on the inside foot as would be experienced under true centrifugal forces.

It is envisaged that the seat itself can be distorted to provide extra pressure under the thighs during braking, reduced pressure under the thighs during acceleration, and increased pressure under the outer thigh and reduced pressure under the inner thigh during cornering.

As set out above, both the hand controls and the foot pedals are subjected to controlled movement with respect to a user's body. They are deliberately driven at different rates to ensure that the range of movement of the limbs that they manipulate is scaled to fit comfortably within the anthropometric range of the $5^{th}$ percentile of females to the $95^{th}$ percentile of males according to the North American standard.

It will be appreciated that the kinematic distortions described above are produced passively via mechanical linkages and require no additional input other than the two actuators 262.

The guide arms 172, 256, 278 and the drive shaft 238 are each manually adjustable in length so that motion of the hub 236 can be tuned. This tuning can be used to inhibit heave (change in elevation) of the vestibular region 286 during operation of the actuators 262.

It will be apparent from the preceding description that the displacement of the virtual pivot point, as described above, can generate an acceleration or deceleration cue for the user, thereby enhancing the simulation. More particularly, the initial linear acceleration transitioning into the pendular movement described above, can generate a sensation of continual linear acceleration. In contrast to the "under the seat" model, the simulation apparatus described herein moves in such a way that the virtual acceleration experienced by the user can be proportional to and in the same direction as the initial offset of the seat or carrier from a central or neutral position.

The appended claims are to be considered as incorporated into the above description.

When any number or range is described herein, unless clearly stated otherwise, that number or range is approximate. Recitation of ranges of values herein are intended to serve as a shorthand method of referring individually to each separate value falling within the range, unless otherwise indicated herein, and each separate value and each separate subrange defined by such separate values is incorporated into the specification as if it were individually recited herein.

Words indicating direction or orientation, such as "front", "rear", "back", "downwardly", "upwardly" etc, are used for convenience. The inventor(s) envisages that various embodiments can be used in a non-operative configuration, such as when presented for sale. Thus, such words are to be regarded as illustrative in nature, and not as restrictive.

Throughout this specification, reference to any advantages, promises, objects or the like should not be regarded as cumulative, composite and/or collective and should be regarded as preferable or desirable rather than stated as a warranty.

Throughout this specification, unless otherwise indicated, "comprise," "comprises," and "comprising," (and variants thereof) or related terms such as "includes" (and variants thereof)," are used inclusively rather than exclusively, so that a stated integer or group of integers may include one or more other non-stated integers or groups of integers.

The term "and/or", e.g., "A and/or B" shall be understood to mean either "A and B" or "A or B" and shall be taken to provide explicit support for both meanings or for either meaning.

It is to be understood that the terminology employed above is for the purpose of description and should not be regarded as limiting. The described embodiments are intended to be illustrative of the invention, without limiting the scope thereof. The invention is capable of being practised with various modifications and additions as will readily occur to those skilled in the art.

The invention claimed is:

1. A motion simulation apparatus that includes:
A motion platform;
    a carrier for carrying a user, the carrier being mounted on the motion platform;
    a drive arm, the drive arm configured to rotate about its longitudinal axis with respect to the motion platform and having a lower end that is pivotally mounted on a substrate to pivot relative to the substrate with two degrees of freedom of movement and an upper end that is pivotally connected to the motion platform to pivot with respect to the motion platform with two degrees of freedom of movement such that rotation of the drive arm can be imparted to the motion platform; and
    two guide arms, each guide arm having a lower end that is pivotally mounted on the substrate to pivot relative to the substrate with three degrees of freedom of movement and an upper end that is pivotally connected to the motion platform to pivot relative to the motion platform with three degrees of freedom of movement, the drive arm, the guide arms and the motion platform defining a dynamic frame that can pivot with respect to the substrate such that a resultant movement of the motion platform can be imparted to the carrier.

2. The motion simulation apparatus as claimed in claim 1, in which the drive arm and the guide arms are angled towards each other from the substrate to the motion platform such that longitudinal axes of the drive arm and the guide arms intersect at a virtual pivot point, with the motion platform interposed between the substrate and said virtual pivot point.

3. The motion simulation apparatus as claimed in claim 2, in which the drive arm is forwardly positioned with respect to the guide arms.

4. The motion simulation apparatus as claimed in claim 3, in which respective planes in which the ends of the drive arm and the guide arms are located are angularly offset with respect to each other such that pivoting of the dynamic frame causes the drive arm to impart rotation to the motion platform as the drive arm pivots to accommodate the angular offset of the respective planes.

5. The motion simulation apparatus as claimed in claim 2, in which the guide arms are of substantially the same length.

6. The motion simulation apparatus as claimed in claim 1, in which the motion simulation apparatus includes two actuators, each actuator having a linearly fixed end that is pivotally mounted to the substrate to pivot relative to the substrate with at least two degrees of freedom of rotational movement, and a working end that is pivotally mounted with three degrees of freedom of rotational movement to the carrier, the drive arm and the guide arms being interposed between the actuators.

7. The motion simulation apparatus as claimed in claim 6, in which the actuators converge towards each other from their fixed ends to their working ends.

8. The motion simulation apparatus as claimed in claim 1, which includes a base assembly, the carrier including a seat assembly arranged above the base assembly, the seat assembly having a seat support and a back support.

9. The motion simulation apparatus as claimed in claim 8, in which the motion platform includes a hub that is fixed to a head region of the back support, the drive arm being in the form of a drive shaft having an operatively upper connector and an operatively lower connector, the upper connector being engaged with a complementary connector of the hub to provide an upper joint that limits movement of the hub relative to the drive shaft to two degrees of freedom of rotational movement and the lower connector being engaged with a complementary connector of the base assembly to provide a lower joint that limits movement of the drive shaft relative to the base assembly to two degrees of rotational movement.

10. The motion simulation apparatus as claimed in claim 9, in which the two guide arms are in the form of two guide struts, each guide strut positioned on a respective side of the drive shaft and having an operatively upper connector and an operatively lower connector, the upper connector being engaged with a complementary connector of the hub to provide an upper joint that permits rotational movement of the hub relative to each guide strut with three degrees of freedom of movement, and each lower connector being engaged with a complementary connector of the base assembly to provide a lower joint that permits rotational movement of the hub relative to each strut relative to the base assembly with three degrees of freedom of movement.

11. The motion simulation apparatus as claimed in claim 10, which includes two linear actuators, the actuators being positioned on respective sides of an operatively vertical plane in which the drive shaft is located when the drive shaft is tilted neither left nor right, each linear actuator interconnecting the base assembly and the seat assembly.

12. The motion simulation apparatus as claimed in claim 11, in which each linear actuator is connected, at a fixed end, to the base assembly with a joint that limits relative movement of the linear actuator and the base assembly to at least two degrees of freedom of rotational movement and, at a working end, to the seat assembly with a joint that limits relative movement of the linear actuator and the seat assembly to between two and four degrees of freedom of movement.

13. The motion simulation apparatus as claimed in claim 10, in which the upper and lower joints of the drive shaft and the guide struts are positioned generally in respective planes to define a dynamic frame that can pivot with respect to the base assembly such that resultant movement of the hub can be imparted to the seat assembly.

14. The motion simulation apparatus as claimed in claim 10, in which a configuration of the base assembly is adjustable to alter a relative angular orientation of the base assembly and the hub such that pivoting of the dynamic frame causes the drive shaft to impart rotation of the hub to simulate yaw.

15. The motion simulation apparatus as claimed in claim 10, in which the upper connector of the drive shaft and the complementary connector of the hub are provided by an upper universal joint and the lower connector of the drive shaft and the complementary connector of the base assembly are provided by a lower universal joint.

16. The motion simulation apparatus as claimed in claim 10, which includes a cockpit floor positioned between the base assembly and the seat assembly.

17. The motion simulation apparatus as claimed in claim 16, in which a joint assembly, that is configured to provide rotational movement with two degrees of freedom of movement, is interposed between the seat support and the cockpit floor so that the seat assembly can rotate with two degrees of freedom relative to the cockpit floor.

18. The motion simulation apparatus as claimed in claim 17, which includes two control strut assemblies, each control strut assembly interconnecting the drive shaft and the cockpit floor, on respective sides of the cockpit floor, with joints that permit two degrees of freedom of rotational movement and three degrees of freedom of translational movement between the drive shaft and the cockpit floor, so serving to constrain roll of the cockpit floor.

19. The motion simulation apparatus as claimed in claim 18, which includes a connector assembly interposed between the cockpit floor and the base assembly, the connector assembly configured to facilitate pivotal movement of the cockpit relative to the base assembly about an operatively vertical axis positioned forwards of the seat assembly.

20. The motion simulation apparatus as claimed in claim 19, in which the connector assembly includes a pivot arm pivotally connected at one end to the base and at an opposite end to the cockpit floor, forwards of the seat assembly.

21. The motion simulation apparatus as claimed in claim 19, in which the connector assembly includes a linear bearing assembly interposed between the cockpit floor and the base to facilitate fore and aft movement of the cockpit floor relative to the base.

* * * * *